United States Patent
Yano

(10) Patent No.: US 11,282,482 B2
(45) Date of Patent: Mar. 22, 2022

(54) DISPLAY SYSTEM THAT GENERATES DATA OF A SPATIAL MAP INDICATING A POSITION OF AN INFORMATION PROCESSING TERMINAL, INFORMATION PROCESSING TERMINAL, METHOD OF DISPLAYING, AND STORAGE MEDIUM

(71) Applicant: CANON KABUSHIKI KAISHA, Tokyo (JP)

(72) Inventor: Masaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/882,923

(22) Filed: May 26, 2020

(65) Prior Publication Data

US 2020/0380937 A1     Dec. 3, 2020

(30) Foreign Application Priority Data

May 31, 2019   (JP) .............................. JP2019-103172

(51) Int. Cl.

| | |
|---|---|
| *H04W 4/029* | (2018.01) |
| *H04W 4/02* | (2018.01) |
| *H04W 4/80* | (2018.01) |
| *H04W 4/33* | (2018.01) |
| *G09G 5/38* | (2006.01) |
| *G09G 5/37* | (2006.01) |

(52) U.S. Cl.
CPC ................. *G09G 5/38* (2013.01); *G09G 5/37* (2013.01); *H04W 4/025* (2013.01); *H04W 4/029* (2018.02); *H04W 4/33* (2018.02); *H04W 4/80* (2018.02); *G09G 2354/00* (2013.01)

(58) Field of Classification Search
None
See application file for complete search history.

(56) References Cited

U.S. PATENT DOCUMENTS

| | | | | |
|---|---|---|---|---|
| 8,571,580 | B2* | 10/2013 | Altman | .................... H04L 51/20 455/456.3 |
| 9,794,753 | B1* | 10/2017 | Stitt | ........................ H04W 4/40 |
| 10,368,186 | B2* | 7/2019 | Stampfl | .................... H04W 8/14 |

(Continued)

FOREIGN PATENT DOCUMENTS

JP        2017037427 A     2/2017

*Primary Examiner* — Joni Hsu
(74) *Attorney, Agent, or Firm* — Venable LLP

(57) ABSTRACT

A display system comprising a communication device and an information processing terminal operable to communicate with the communication device. An acquiring unit, based on information related to an angle between the information processing terminal and the communication device, which is obtained from advertising information communicated between the information processing terminal and the communication device on a floor, acquires information indicating a relative position between the information processing terminal and the communication device. A display control unit causes a display unit of the information processing terminal to display a spatial map. The display control unit, based on the information indicating the relative position acquired by the acquiring unit, causes a position of the information processing terminal to be displayed on the spatial map.

10 Claims, 16 Drawing Sheets

(56) References Cited

U.S. PATENT DOCUMENTS

| | | | | |
|---|---|---|---|---|
| 2007/0185768 A1* | 8/2007 | Vengroff | ............... | G06Q 30/04 |
| | | | | 705/14.64 |
| 2012/0075145 A1* | 3/2012 | Kee | .......................... | G01S 5/02 |
| | | | | 342/442 |
| 2013/0279543 A1* | 10/2013 | Torimoto | ............... | G01S 19/48 |
| | | | | 375/146 |
| 2014/0066091 A1* | 3/2014 | Varoglu | ............... | H04W 4/025 |
| | | | | 455/456.1 |
| 2015/0245351 A1* | 8/2015 | Banerjea | ............... | H04H 20/71 |
| | | | | 370/338 |
| 2015/0289081 A1* | 10/2015 | Chen | .................... | H04W 8/005 |
| | | | | 455/41.2 |
| 2016/0309403 A1* | 10/2016 | Huang | .................. | H04B 11/00 |
| 2017/0171719 A1* | 6/2017 | Igarashi | ................. | H04W 4/33 |
| 2020/0228953 A1* | 7/2020 | Thoukydides | ........ | H04W 24/08 |

\* cited by examiner

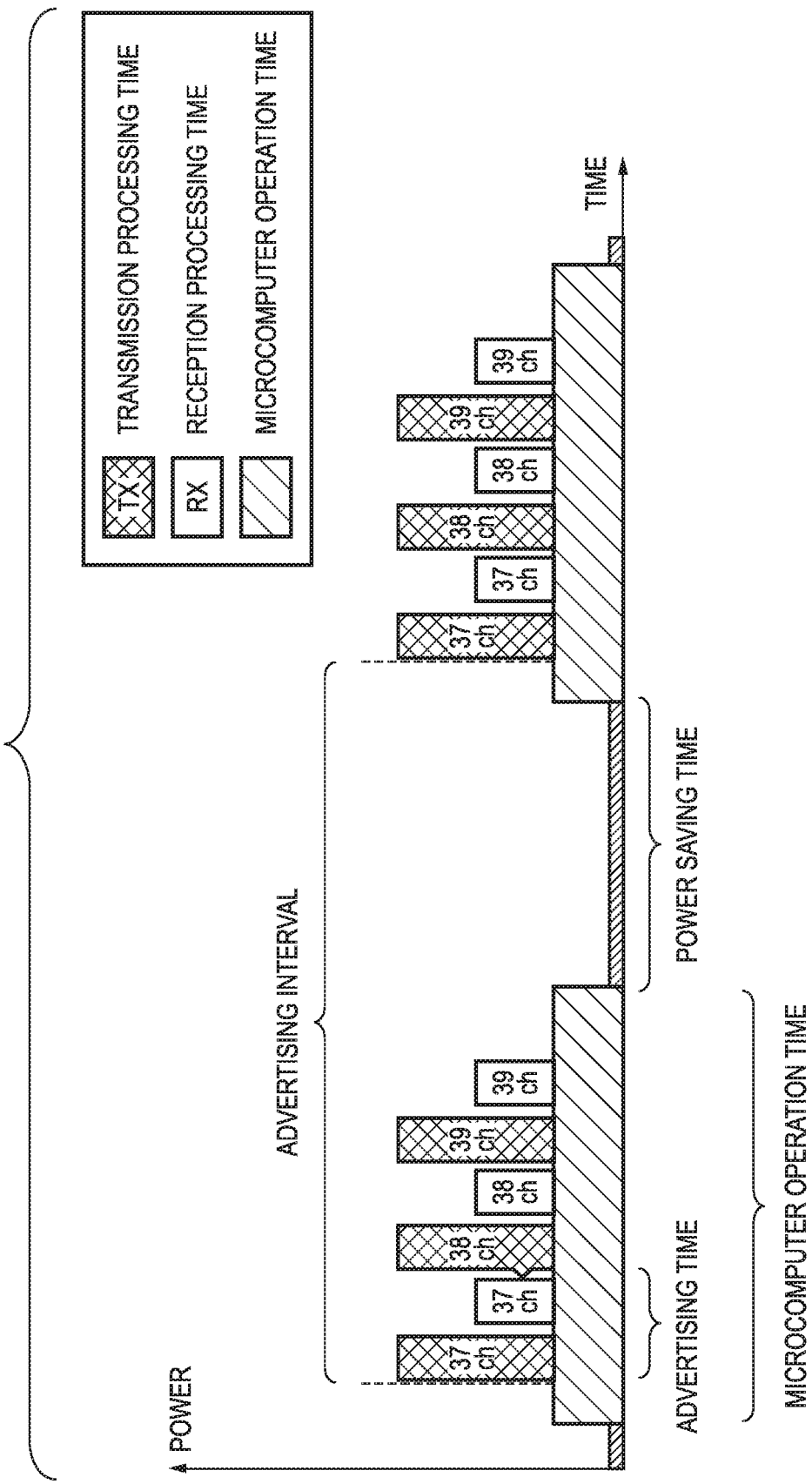

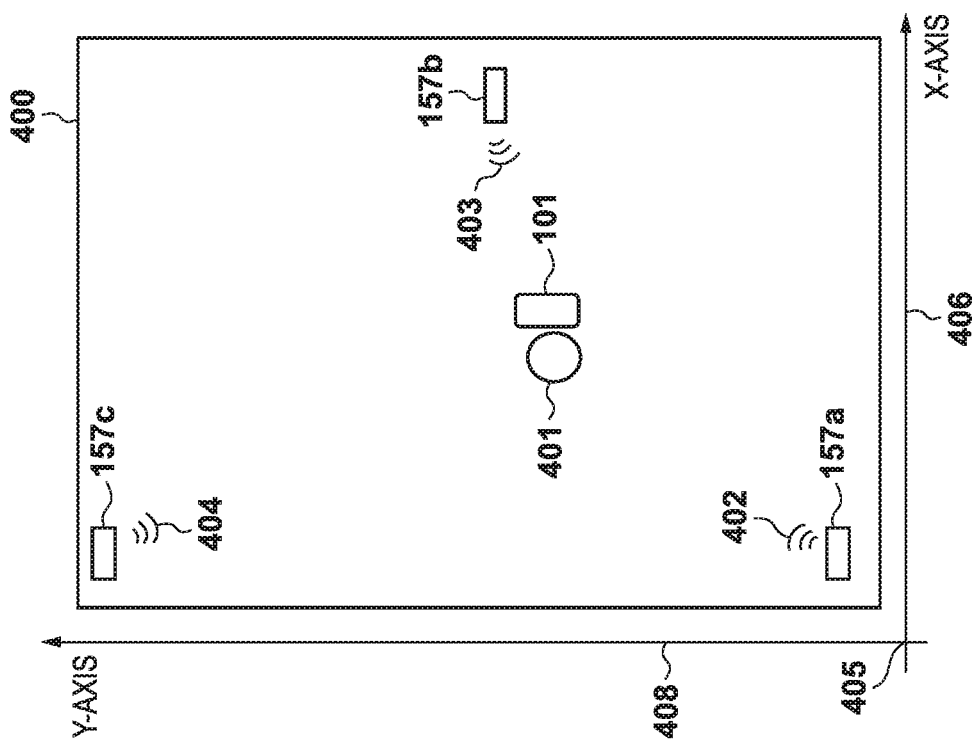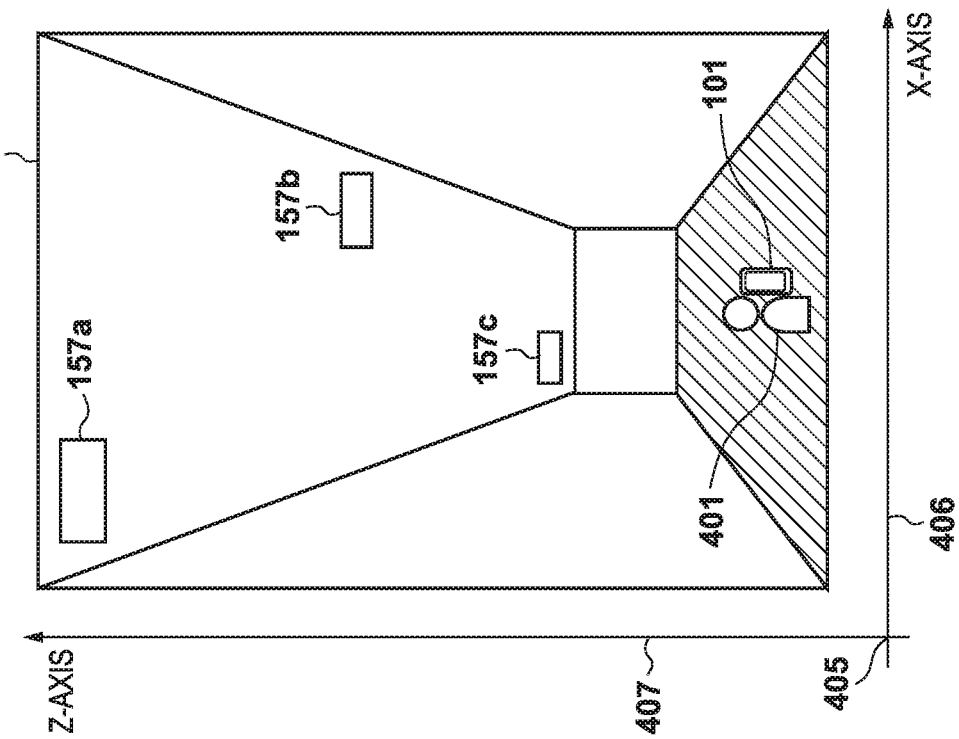

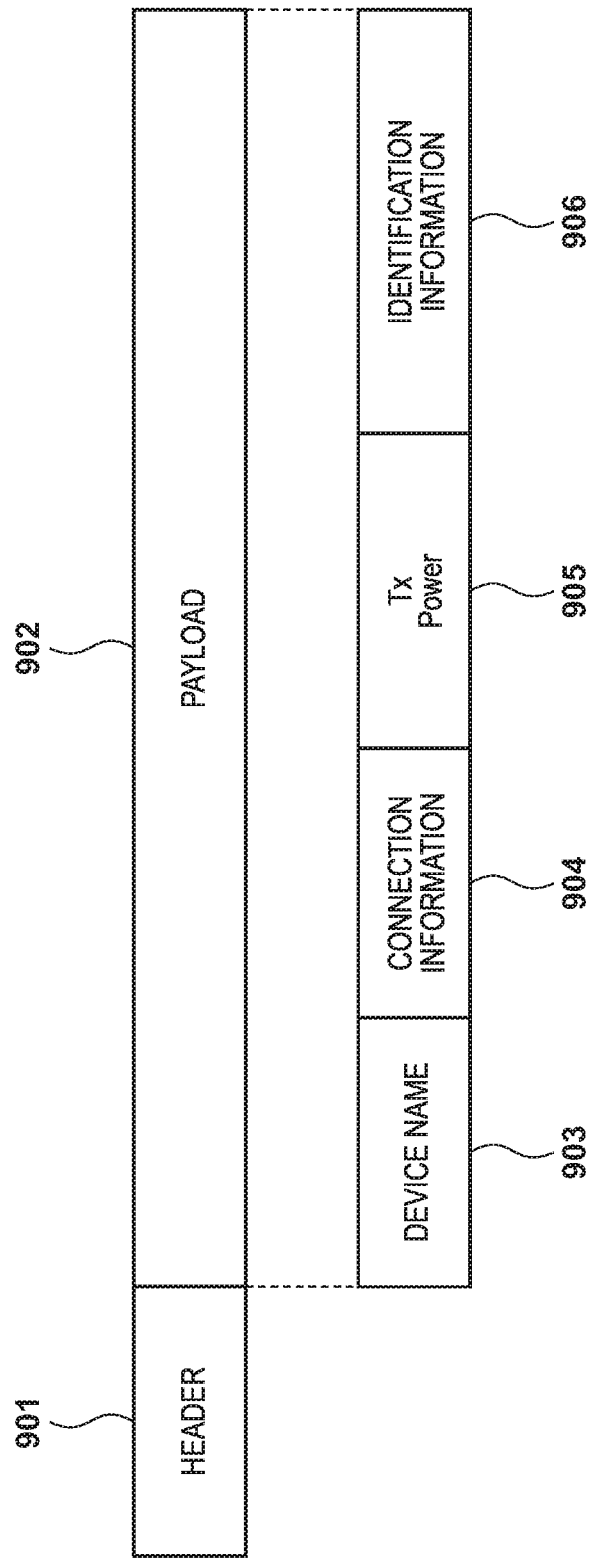

F I G. 11

SERVICE 00000000-0000-1000-1000-00405f9b34fb

CHARACTERISTIC 00000000-0000-2000-1000-00405f9b34fb

DESCRIPTOR 00000000-0000-2000-1000-00405f9b3400

FIG. 12

| Service UUID | Service Name | Characteristic UUID | Characteristic NAME | Service READ POSSIBLE | Service WRITE POSSIBLE | Characteristic READ POSSIBLE | Characteristic WRITE POSSIBLE | Characteristic INDICATION POSSIBLE | VALUE | PAIRING NECESSARY |
|---|---|---|---|---|---|---|---|---|---|---|
| 0x1801 | GATT Service | 0x2A05 | Service Changed | | | | | ○ | 0 | |
| | | 0x2B2A | Database Hash | ○ | | ○ | | | F0 CA 2D 48 EC F5 8B AC 8A AA 30 BB B9 FB A9 90 | |
| 0x180A | Device Information | 0x2A29 | Manufacturer Name String | | | ○ | | | Printer Device | |
| | | 0x2A24 | Hardware Revision String | ○ | | ○ | | | 1010_AAA | |
| | | 0x2A25 | Firmware Revision String | | ○ | ○ | | | 2030000 | |
| | | 0x2A26 | Software Revision String | ○ | | ○ | | | 0001 | |
| 00000000-0000-1000-1000-00405f9b34fb | IJ Original | 00000000-0000-2000-1000-00405f9b34fb | SSID | | | ○ | | | Printer SSID | ○ |
| | | 00000000-0000-2000-1000-00405f9b34fc | PASSWORD | | | ○ | | | aaaabbbb | ○ |

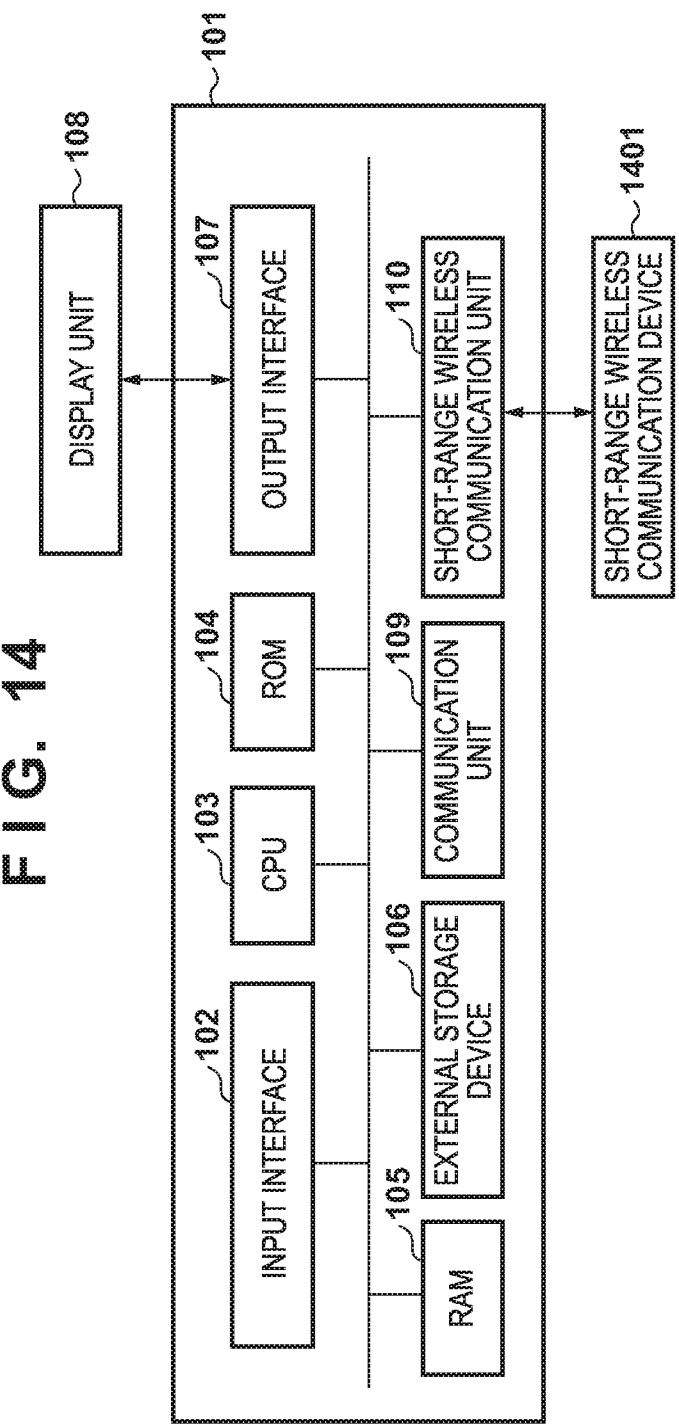

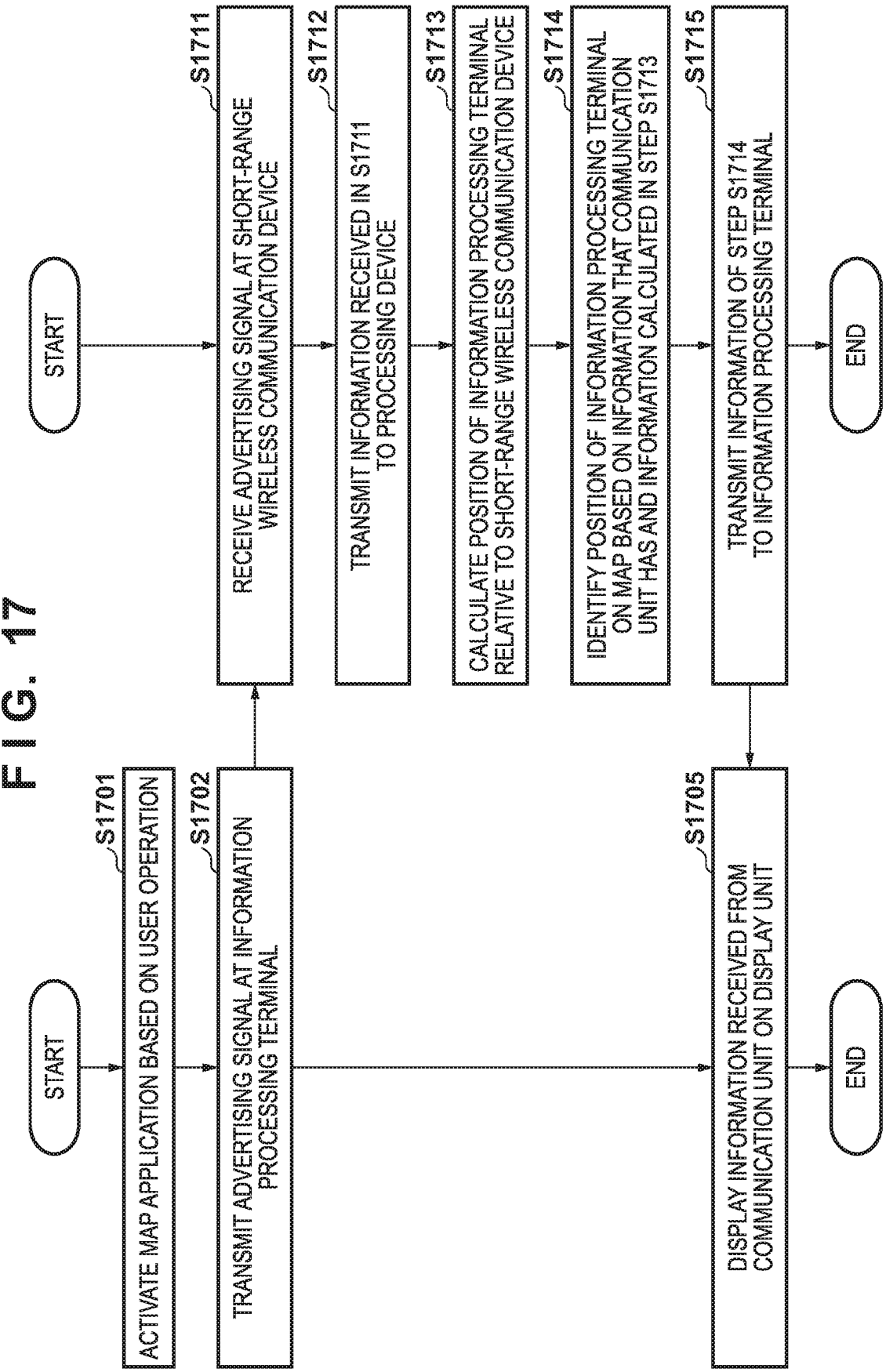

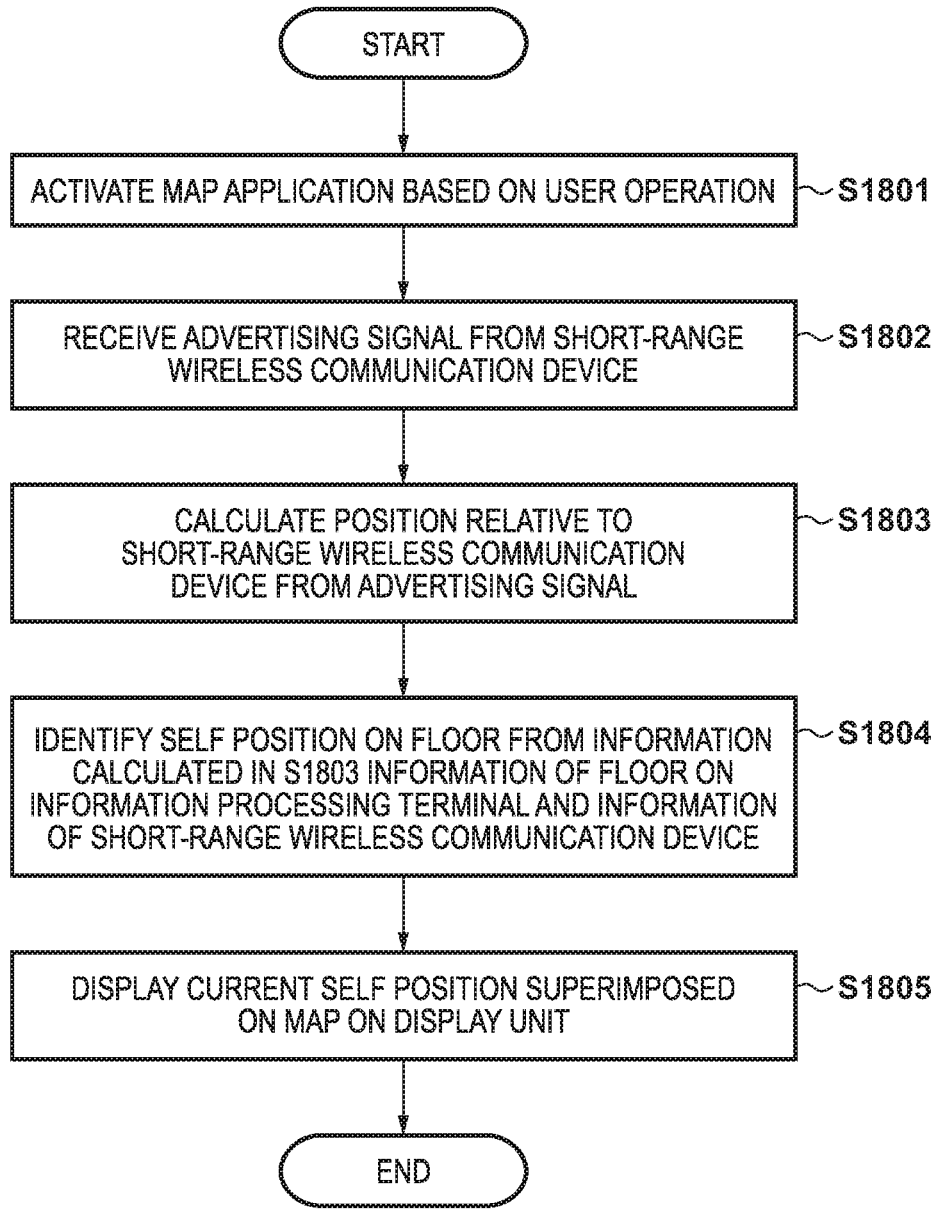

DISPLAY SYSTEM THAT GENERATES DATA OF A SPATIAL MAP INDICATING A POSITION OF AN INFORMATION PROCESSING TERMINAL, INFORMATION PROCESSING TERMINAL, METHOD OF DISPLAYING, AND STORAGE MEDIUM

BACKGROUND OF THE INVENTION

Field of the Invention

The present invention relates to a display system, an information processing terminal, a method of displaying, and a storage medium.

Description of the Related Art

There is a known technique by which a distance between devices is identified by using wireless communication using Bluetooth (registered trademark) (Japanese Patent Laid-Open No. 2017-037427).

SUMMARY OF THE INVENTION

According to one embodiment of the present invention, a display system comprising a communication device and an information processing terminal operable to communicate with the communication device, the system comprising: an acquiring unit configured to, based on information related to an angle between the information processing terminal and the communication device, which is obtained from advertising information communicated between the information processing terminal and the communication device on a floor, acquire information indicating a relative position between the information processing terminal and the communication device; and a display control unit configured to cause a display unit of the information processing terminal to display a spatial map, wherein the display control unit, based on the information indicating the relative position acquired by the acquiring unit, causes a position of the information processing terminal to be displayed on the spatial map.

According to another embodiment of the present invention, an information processing terminal operable to communicate with a communication device, the terminal comprising: an acquiring unit configured to, based on information related to an angle between the information processing terminal and the communication device, which is obtained from advertising information communicated between the information processing terminal and the communication device on a floor, acquire information indicating a relative position between the information processing terminal and the communication device; and a display control unit configured to cause a display unit of the terminal to display a spatial map, wherein the display control unit, based on the information indicating the relative position acquired by the acquiring unit, causes a position of the terminal to be displayed on the spatial map.

According to still another embodiment of the present invention, a method of displaying by a display system comprising a communication device and an information processing terminal operable to communicate with the communication device, the method comprising: based on information related to an angle between the information processing terminal and the communication device, which is obtained from advertising information communicated between the information processing terminal and the communication device on a floor, acquiring information indicating a relative position between the information processing terminal and the communication device; and controlling to cause a display unit of the information processing terminal to display a spatial map, wherein the controlling, based on information indicating the acquired relative position, causes a position of the information processing terminal to be displayed on the spatial map.

According to still yet another embodiment of the present invention, a non-transitory computer-readable storage medium storing a program for causing a computer of an information processing terminal to function as: an acquiring unit configured to, based on information related to an angle between the information processing terminal and a communication device, which is obtained from advertising information communicated between the information processing terminal and the communication device on a floor, acquire information indicating a relative position between the information processing terminal and the communication device; and a display control unit configured to cause a display unit of the terminal to display a spatial map, wherein the display control unit, based on the information indicating the relative position acquired by the acquiring unit, causes a position of the terminal to be displayed on the spatial map.

Further features of the present invention will become apparent from the following description of exemplary embodiments (with reference to the attached drawings).

BRIEF DESCRIPTION OF THE DRAWINGS

FIG. 3 is a view illustrating power consumption for respective processes when advertising information transmission processing and BLE connection request reception processing are repeated three times for each channel according to an embodiment.

FIG. 4A is a perspective view illustrating an example of a floor where a short-range wireless communication device is positioned.

FIG. 4B is a plan view of FIG. 4A.

FIG. 9 is a view illustrating an example of a structure of advertising information that a short-range wireless communication device according to an embodiment broadcasts to its surroundings.

FIG. 11 is a view illustrating an example of a data structure of GATT according to an embodiment.

FIG. 12 is a view exemplifying GATT data structured by a short-range wireless communication device according to an embodiment.

FIG. 14 is a block diagram illustrating a configuration example of the information processing terminal and a short-range wireless device according to an embodiment.

FIG. 15 is a view illustrating an example of installation position information indicating positioning of short-range wireless communication devices on a floor according to an embodiment.

FIG. 17 is a flowchart illustrating a flow of processing of the map application in the information processing terminal according to an embodiment and a communication unit.

FIG. 18 is a flowchart illustrating a flow of processing of the map application in an information processing terminal according to an embodiment.

DESCRIPTION OF THE EMBODIMENTS

Figure 1:
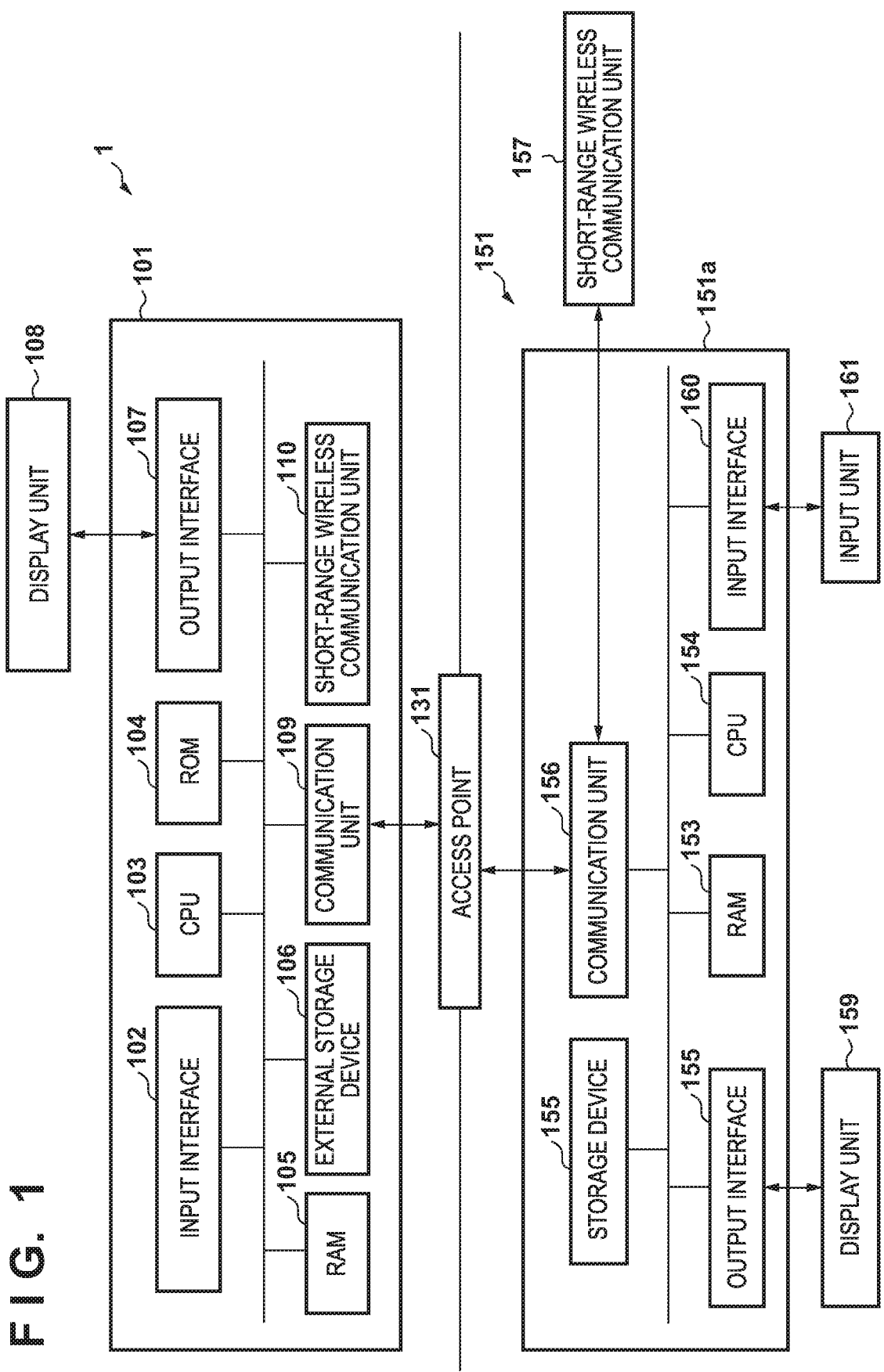
FIG. 1 is a block diagram illustrating a configuration of communication system including a communication unit capable of communicating with an information processing terminal according to an embodiment.

In the above-mentioned conventional technique, a distance between devices is identified based on a signal strength when a signal transmitted from one device is received by the other device. However, it is necessary to improve the accuracy of position detection for use in display of positions in places where there are many small paths such as shopping malls and underground shopping areas. Though a method of detecting a current position by using GPS (Global Positioning System) can be considered, position detection using GPS is weak with respect to occluding objects, and so there are cases where good performance cannot be achieved due to a decrease in accuracy in bad weather, indoors, or underground.

In consideration of the above problems, embodiments of the present invention provide a technique for higher accuracy position display even under conditions where GPS cannot achieve good performance.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Overall Configuration>

Explanation will be given for an information processing terminal included in a communication system and a communication device of the present embodiment. In the present embodiment, a smart phone is given as an example of an information processing terminal, but limitation is not made to this. Various devices can be applied such as a mobile terminal, a notebook PC, a tablet terminal, a PDA (Personal Digital Assistant), a digital camera, and a wearable device. In the present embodiment, a PC server is given as an example of a processing device of a communication unit, but limitation is not made to this, and various devices can be applied if the devices can wirelessly communicate with an information processing terminal and can perform information processing. For example, a mobile terminal, a smart phone, a notebook PC, and a tablet terminal or the like can be applied.

FIG. 1 is a block diagram illustrating a configuration of a communications system (display system) including an information processing terminal of the present embodiment and a communication unit which can communicate with the information processing terminal. A communication system 1 (display system) includes an information processing terminal 101 and a communication device 151. In the present embodiment, explanation is given using the following configuration as an example, but limitation is not made to the functions in this diagram in particular.

The information processing terminal 101 comprises an input interface 102, a CPU 103, a ROM 104, a RAM 105, an external storage device 106, an output interface 107, a display unit 108, a communication unit 109, a short-range wireless communication unit 110 or the like.

The input interface 102 is an interface for receiving data input or operating instructions from a user, and comprises a physical keyboard, buttons, and a touch panel or the like. Note that, an output interface 107 which is described later and the input interface 102 have the same configuration, and screen output and acceptance of operations from the user may be performed in the same configuration.

The CPU 103 is a system control unit, and controls the information processing terminal 101 as a whole. The ROM 104 stores fixed data such as control programs which are executed by CPU 103, data tables, an embedded operating system (hereinafter, OS) program, and the like. In the present embodiment, each control program stored in the ROM 104 performs software execution control such as scheduling, task switching, and interrupt processing under the management of the embedded OS which is stored in the ROM 104. The CPU 103 performs display control to cause the display unit 108 of the self device to display a floor map associated with a position of a short-range wireless communication device 157 in a map application which is described later.

The RAM 105 is used as a main memory and a work memory of the CPU 103. A memory area which stores setting information of the information processing terminal 101 and management data of the information processing terminal 101 or the like is provided in the RAM 105. The RAM 105 configured by, for example, an SRAM (Static Random Access Memory) which requires a backup power supply. Note that, in the RAM 105, data is held by using a primary battery for data backup (not shown), and important data such as program control variables can be stored in a non-volatile manner.

The external storage device 106 saves various programs. For example, the external storage device 106 saves an application providing a function for displaying a current position and a position information generation program which generates position information which can be interpreted by the information processing terminal 101. The external storage device 106 saves various programs such as a program for controlling transmission/reception of information which is transmitted/received with respect to the communication device 151 which is connected via the communication unit 109 and various information used by these programs.

The output interface 107 is an interface for performing control so that the display unit 108 displays data or notifies the state of the information processing terminal 101. The display unit 108 is configured using an LED (light emitting diode) and an LCD (liquid crystal display) or the like, displays data, and notifies the state of the information processing terminal 101. Note that, configuration may also be taken such that input from a user is accepted via the display unit 108 by providing a soft keyboard which comprises keys such as numeral input keys, a mode setting key, a deciding key, a cancel key, and a power supply key on the display unit 108.

The communication unit 109 performs data communication by connecting with a device such as the communication device 151. For example, the communication unit 109 can connect with an access point (not shown) in the communication device 151. By connecting the communication unit 109 with the access point in the communication device 151, the information processing terminal 101 and the communication device 151 can communicate with each other. Note that, the communication unit 109 may communicate with the communication device 151 directly by wireless communication in this way, and may communicate via an external access point (an access point 131) which exists outside the information processing terminal 101 and the communication device 151.

In the embodiment, the communication unit 109 connects with the communication device 151 by wireless communication. As the wireless communication method, for example, Wi-Fi (Wireless Fidelity) (registered trademark) which is a communication method conforming to the IEEE 802.11 series (IEEE 802.11a, IEEE 802.11n (Wi-Fi 4), IEEE 802.11ac (Wi-Fi 5), IEEE 802.11ax (Wi-Fi 6) and the like), Bluetooth (registered trademark), and the like can be used. As the access point 131, for example, a device such as a wireless LAN router or the like can be used. In the present embodiment, the method in which the information processing terminal 101 and the communication device 151 connect directly without going through on an external access point is referred to as a direct connection method. Also, the method in which the information processing terminal 101 and the communication device 151 connect via the external access point 131 is referred to as an infrastructure connection method.

The short-range wireless communication unit 110 executes data communication with a device such as the short-range wireless communication device 157 by using short-distance wireless communication signals. In the case of the present embodiment, the short-range wireless communication unit 110 executes communication by a different communication method from the communication unit 109. The short-range wireless communication unit 110 can connect with the short-range wireless communication device 157 included in the communication device 151. Note that, in the present embodiment, as the communication method of the short-range wireless communication unit 110, Bluetooth 5.1 technology is used. However, the present embodiment is not limited to this standard, and a standard with a position detection function greater than or equal to that of Bluetooth 5.1 such as Bluetooth standards after Bluetooth 5.1 can be applied. Note that, though Bluetooth 5.1 includes both the Classic Bluetooth and Bluetooth Low Energy (BLE) standards, BLE is used as the communication method of the short-range wireless communication device 157 in the present embodiment. The short-range wireless communication unit 110 and the short-range wireless communication device 157 can communicate within a predetermined distance, and the predetermined distance may be, for example, from a few meters to a few hundred meters when BLE is used.

Next, an example of configuration of the communication device 151 will be described. The communication device 151 comprises a processing device 151a and the short-range wireless communication device 157 (communication device). The processing device 151a comprises a RAM 153, a CPU 154, a storage device 155, a communication unit 156, an output interface 158, a display unit 159, an input interface 160, and an input unit 161.

In the case of the present embodiment, the communication unit 156 has, as an access point internal to the processing device 151a, an access point for connecting with a device such as the information processing terminal 101. Note that, by this internal access point, the communication device 151 operates as a parent station and can be connected to the communication unit 109 of the information processing terminal 101. In other words, by this internal access point, the communication device 151 can make a direct connection to the information processing terminal 101. Incidentally, the communication unit 156 may communicate with the information processing terminal 101 directly by wireless communication and may communicate with the information processing terminal 101 via the access point 131. As the communication method, for example, Wi-Fi (registered trademark) which is a communication method conforming to the IEEE 802.11 series (IEEE 802.11a, IEEE 802.11n (Wi-Fi 4), IEEE 802.11ac (Wi-Fi 5), IEEE 802.11ax (Wi-Fi 6) and the like) can be used. Also, in the case of direct connection, the communication unit 156 may comprise hardware which functions as an access point and may operate as an access point by software which causes the communication unit 156 to function as an access point. In addition, the communication unit 156 may function as a Group Owner which is a parent station in Wi-Fi Direct (registered trademark). Incidentally, as a communication method, Bluetooth (registered trademark) or the like can be used.

The short-range wireless communication device 157 wirelessly connects at short-range to a device such as the information processing terminal 101. In the present embodiment, as a communication method of the short-range wireless communication device 157, Bluetooth 5.1 technology is used. More specifically, in the present embodiment, as a communication method of the short-range wireless communication device 157, BLE is used. Also, in the present embodiment, the short-range wireless communication device 157 is provided externally to the processing device 151a of the communication device 151, but the short-range wireless communication device 157 may be embedded internally in the processing device 151a. In other words, the communication device 151 may be configured as a single device. Also, a plurality of the short-range wireless communication device 157 may be provided for the processing device 151a.

Furthermore, in the present embodiment, though the short-range wireless communication device 157 communicates directly with the communication unit 156 by wireless communication, they may communicate directly in wired communication and may communicate via the access point 131. Note that, the number of short-range wireless communication devices 157 is not limited to one and there may be a plurality of the short-range wireless communication device 157.

The CPU 154 is a system control unit and controls the communication device 151 as a whole. The storage device 155 is a non-volatile storage unit. Here, storage device indicates an HDD, an SSD, or the like. Note that, a portable CD-ROM, an internally installed ROM or the like may be used as a storage unit.

The RAM 153 is a main memory and a work memory of the CPU 154. Various applications (software) are stored in, for example, the storage device 155, are read out by the RAM 153 as necessary, and are executed by the CPU 154. By this, the CPU 154 realizes functions of various applications (software). Also, a reception buffer for temporarily saving information received from the information processing terminal 101 or the like and various other information are stored.

Note that, memory such as an external HDD, an SD card or the like may be attached to the communication device 151 as an option unit, and information saved in the communication device 151 may be saved in the memory.

Also, for the communication device 151 in the present embodiment, a connection mode is set by connection setting processing and communication is performed with the information processing terminal 101 by the connection configuration based on the set connection mode. For example, in the communication device 151, when communication is to be performed by an infrastructure connection, an infrastructure connection mode is set as the connection mode. For example, in the communication device 151, when communication is to be performed by direct connection, a direct connection mode is set as the connection mode. Here, as an example, processing is shared between the information processing terminal 101 and the communication device 151 as described above, however, the form of sharing is not particularly limited to this, and other forms are also possible.

In the present embodiment, the information processing terminal 101 stores a predetermined application in the ROM 104, the external storage device 106 or the like. The predetermined application is, for example, an application program for transmitting/receiving position information of the information processing terminal 101 and map data and the like which is stored in the communication device 151. Hereinafter, an application having such a function will be referred to as a map application.

Also, in the present embodiment, the short-range wireless communication unit 110 communicates with the short-range wireless communication device 157 by BLE. At that time, the short-range wireless communication device 157 functions as an advertiser (or slave) which broadcasts advertising information which is described later, and the short-range wireless communication unit 110 functions as a scanner (or master) which receives the advertising information. Meanwhile, in the present embodiment, the communication unit 109 and the communication unit 156 communicate by a wireless LAN (Wi-Fi).

<Transmission of Advertising Information and Reception of BLE Connection Request>

Here, processing of transmission of advertising information in a BLE standard and reception of a BLE connection request will be described. In the present embodiment, the short-range wireless communication device 157 performs the above described processing so that the short-range wireless communication device 157 operates as an advertiser device as described above. The short-range wireless communication device 157 communicates having divided a 2.4 GHz frequency band into 40 channels (0-39 ch). The short-range wireless communication device 157 uses the 37-39th channels for transmitting advertising information and receiving BLE connection requests, and uses 0-36th channels for data communication after BLE connection.

Figure 2:
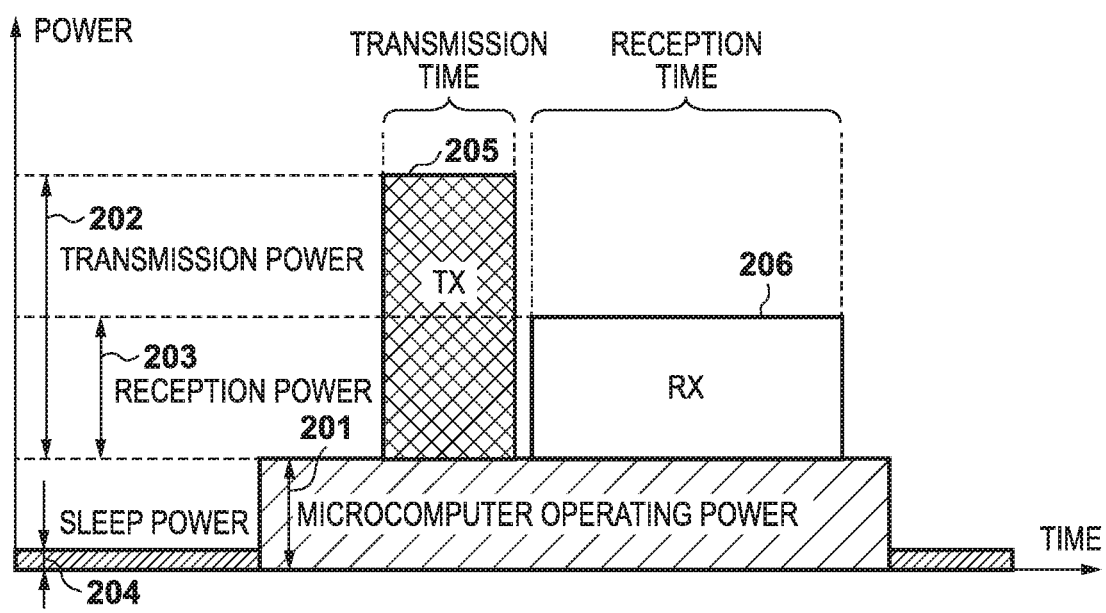
FIG. 2 is a view illustrating power consumption for respective processes when advertising information is transmitted using one channel according to an embodiment.

FIG. 2 illustrates power consumption for respective processes when advertising information is transmitted using one channel. The vertical axis of FIG. 2 indicates power consumption of the short-range wireless communication device 157, and the horizontal axis indicates time. TX 205 indicates total power consumption in transmission processing which is processing for broadcasting advertising information. RX 206 indicates total power consumption in reception processing which is processing for enabling a receiver to receive a BLE connection request. A transmission power 202 indicates an instantaneous power consumption by transmission processing. Also, a reception power 203 indicates an instantaneous power consumption by reception processing. Also, a microcomputer operating power 201 indicates an instantaneous power consumption when a microcomputer in the short-range wireless communication device 157 is operating.

Note that, because the microcomputer operates before and after or during TX 205 and RX 206, it is necessary to activate the microcomputer in advance so as to execute or stop the transmission/reception processing. Also, when transmission of the advertising information is performed using a plurality of channels, the consumption power increases in proportion to the number of channels used to perform the transmission of the advertising information. Also, while the microcomputer is not operating and the short-range wireless communication device 157 is in a power saving state, a sleep power 204 is the instantaneous power consumption of the short-range wireless communication device 157. In this way, the short-range wireless communication device 157 waits for transmission of a BLE connection request from the information processing terminal 101 by performing reception processing for a fixed time using the same channel after performing transmission processing using a predefined channel.

FIG. 3 illustrates power consumption for each process when advertising information transmission processing and BLE connection request reception processing are repeated three times for each channel. The short-range wireless communication device 157, after repeating advertising information transmission processing and reception processing three times for each channel, enters the power saving state for a fixed time by stopping the microcomputer operation.

Hereinafter, the combination of processing for transmitting advertising information by a predefined channel and processing for receiving a BLE connection request is referred to as advertising. Also, a time interval for transmitting the advertising information by the predefined channel is referred to as an advertising interval. Note that, the number of repeated advertisements from when the first advertisement is performed until when the power saving state is entered can be changed arbitrarily as long as it is equal to or lower than three times. Also, in FIG. 3, the channels used when advertising are in the sequential order of the 37th channel, and then the 38th channel, and then the 39th channel, but this order may be random. For example, the order may be different for the first advertisement, the second advertisement, and the third advertisement.

<Structural Example of Advertising Information>

Figure 5:
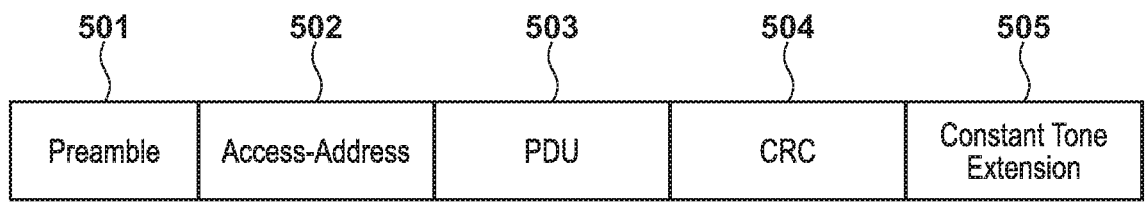
FIG. 5 is a view illustrating an example of a structure of advertising information which is transmitted by a short-range wireless communication device according to an embodiment.

FIG. 5 is a view illustrating an example of a structure of advertising information which is transmitted by the short-range wireless communication device 157. The short-range wireless communication device 157 transmits this the advertising information in order to cause the information processing terminal 101 to detect a distance to the short-range wireless communication device 157 and a direction of the short-range wireless communication device 157.

A Constant Tone Extension 505 (CTE) is data used so as to detect a direction of the short-range wireless communication device 157 in relation to the information processing terminal 101. A Preamble 501 is data for clock synchronization for when the information processing terminal 101 receives the advertising information of the short-range wireless communication device 157. An Access-Address 502 is data for frame synchronization for when the information processing terminal 101 receives the advertising information of the short-range wireless communication device 157. A PDU 503 (Protocol Data Unit) is an actual data part in the advertising information which the short-range wireless communication device 157 transmits. Note that, a header 901 and a payload 902 which are advertising information illustrated in FIG. 9 which is described later are the information included in the PDU 503. A CRC 504 is an error detecting code value for the PDU 503 for the time of communication.

FIG. 9 is a view illustrating an example of a structure of advertising information in which the short-range wireless communication device 157 broadcasts to its surroundings. The short-range wireless communication device 157 performs an initialization process after starting the supply of power, and enters the advertising state. When the short-range wireless communication device 157 enters the advertising state, it broadcasts the advertising information to its surroundings periodically based on the advertising interval. In the case of the present embodiment, the advertising information is configured from the header 901 and the payload 902. The header 901 and the payload 902 are included in the PDU 503 of FIG. 5.

The header 901 is a region storing an advertising information type, information on the size of the payload 902, and the like. The payload 902 stores information such as a device name 903 or installation profile information as identification information, connection information 904 for a BLE connection with the communication device 151, and an advertising information transmission power (Tx Power) 905. Note that, identification information 906 may be included in the advertising information. The identification information 906 is identification information for identifying a device which transmits the advertising information. For example, the identification information 906 is a MAC address of the device, service information of the device, an SSID of the access point inside the device, a MAC address of a locator, a BD_ADDR of the locator, a password, and the like.

The information processing terminal 101 can recognize the existence of the communication device 151 by receiving this advertising information from the short-range wireless communication unit 110. Furthermore, the information processing terminal 101 can make the BLE connection with the communication device 151 by the short-range wireless communication unit 110 transmitting a BLE connection request to the short-range wireless communication device 157.

In the present embodiment, the short-range wireless communication device 157, when the communication device 151 is powered on, enters the advertising state, and starts transmitting the advertising information. However, the timing at which the short-range wireless communication device 157 starts transmitting the advertising information is not limited to this and, for example, may be the timing at which a predetermined operation for enabling a BLE function is performed in the communication device 151.

In one embodiment, the short-range wireless communication device 157 may transmit first advertising information, and in a case where the short-range wireless communication device 157 accepts a scan request from the information processing terminal 101 in response thereto, the short-range wireless communication device 157 transmits second advertising information whose content is different from that of the first advertising information. The first advertising information, for example, includes information related to the advertising information transmission power, information for identifying the short-range wireless communication device 157, or the like. The second advertising information, for example, includes information for identifying the communication device 151 and the short-range wireless communication device 157 and information related to functions and hardware that the communication device 151 has. In the case of the present embodiment, for example, a map application is designed to handle the second advertising information. Hereinafter, the advertising information that the map application handles will be described as the second advertising information.

<Method of Detecting the Direction of the Short-Range Wireless Communication Device 157>

Figure 6:
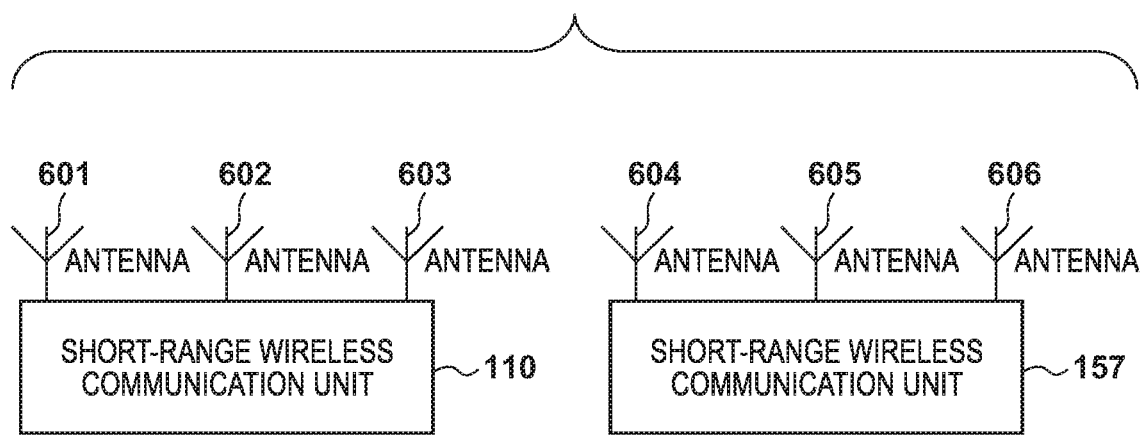
FIG. 6 is a schematic view for explaining function in which a short-range wireless communication unit of the information processing terminal detects a direction of a short-range wireless communication device according to an embodiment.

FIG. 6 is a schematic view for explaining function in which the short-range wireless communication unit 110 of the information processing terminal 101 detects direction of the short-range wireless communication device 157. The short-range wireless communication unit 110 inside the information processing terminal 101 comprises antennas 601, 602, and 603, and the short-range wireless communication device 157 comprises antennas 604, 605, and 606. Note that, the numbers of antennas which the short-range wireless communication unit 110 and the short-range wireless communication device 157 have are not limited to this. For example, the numbers of antennas may be one, two, or three or more. Also, the numbers of antennas which the short-range wireless communication unit 110 and the short-range wireless communication device 157 have may be different. Also, the antennas which the short-range wireless communication unit 110 and the short-range wireless communication device 157 have in FIG. 6 are arranged in a straight line, but the arrangement of the antennas is not limited to this.

Two methods by which the information processing terminal 101 can detect the direction of the short-range wireless communication device 157 are: (1) a method realized by providing the short-range wireless communication unit 110 with a plurality of antennas and (2) a method realized by providing the short-range wireless communication device 157 with a plurality of antennas.

Figure 7:
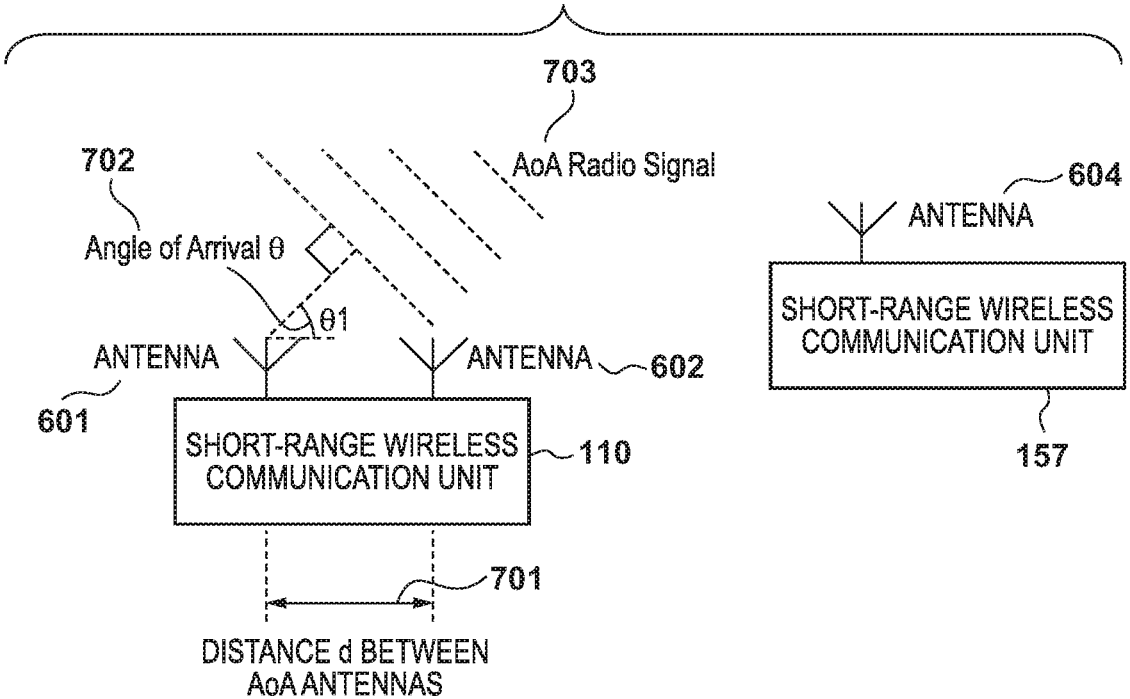
FIG. 7 is a schematic view illustrating an AOA (Angle of Arrival) type detection method according to an embodiment.

Using FIG. 7, the above described method (1) will be explained. Method (1) is a method of detecting a so-called AOA (Angle of Arrival). The short-range wireless communication device 157 transmits, by using the antenna 604, an AoA Radio Signal 703 which is advertising information including the CTE 505. The short-range wireless communication unit 110 receives the AoA Radio Signal 703 by a plurality of antennas (both the antenna 601 and the antenna 602).

Here, an AoA distance d 701 between antennas which is distance between the antenna 601 and the antenna 602 is assumed to be d1, and an Angle of Arrival θ 702 which is a direction (angle) from the information processing terminal 101 to the short-range wireless communication device 157 is assumed to be θ1. At that time, radio waves received by the antenna 601 are received after passing over a distance that is longer than the radio waves received in the antenna 602 by d1×cos(θ1). Accordingly, when a wavelength of radio waves is assumed to be λ, the phase of radio waves received in the antenna 601 is delayed from the phase of the radio waves received in the antenna 602 by $$\psi1=2\pi\times(d1\times\cos(\theta1)/\lambda) \quad \text{Equation (1)}.$$

Here, ψ1 is the difference between the phase of radio waves received in the antenna 602 and the phase of radio waves received in the antenna 601. From Equation (1), the AoA θ 702 can be calculated as follows:

$$\theta1=\arccos((\psi1\times\lambda)/(2\pi\times d1)) \quad \text{Equation (2)}.$$

In this way, the information processing terminal 101, after receiving the advertising information from the short-range wireless communication device 157, can detect the direction of the short-range wireless communication device 157 (in other words, the angle between the short-range wireless communication device 157 and the short-range wireless communication unit 110) by calculating the Angle of the Arrival θ 702.

Figure 8:
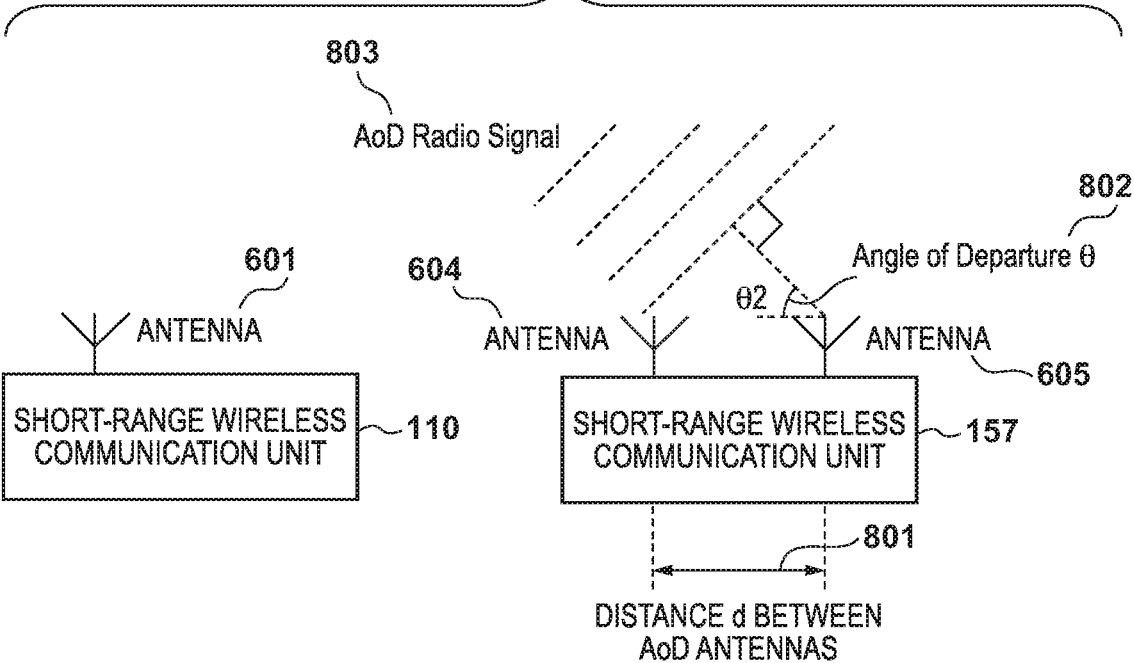
FIG. 8 is a schematic view illustrating an AoD (Angle of Departure) type detection method according to an embodiment.

Using FIG. 8, the above-mentioned method (2) will be explained. Method (2) is a method of detecting the so-called AoD (Angle of Departure). In the configuration of FIG. 8, from each of a plurality of antennas (the antenna 604 and the antenna 605) of the short-range wireless communication device 157 which is a transmission side device, an AoD Radio Signal 803 which is advertising information including the CTE 505 is transmitted in respectively different periods.

Figure 19A:
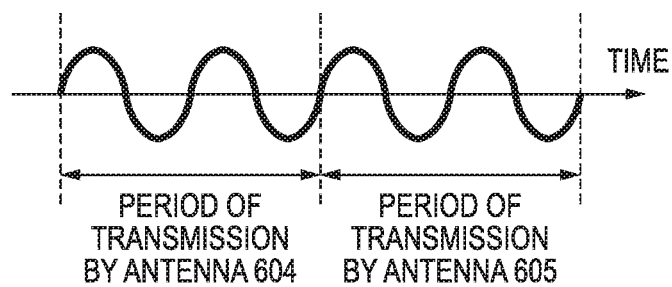
FIG. 19A is a view schematically illustrating a phase shift of signals transmitted from a plurality of antennas according to an embodiment.
Figure 19B:
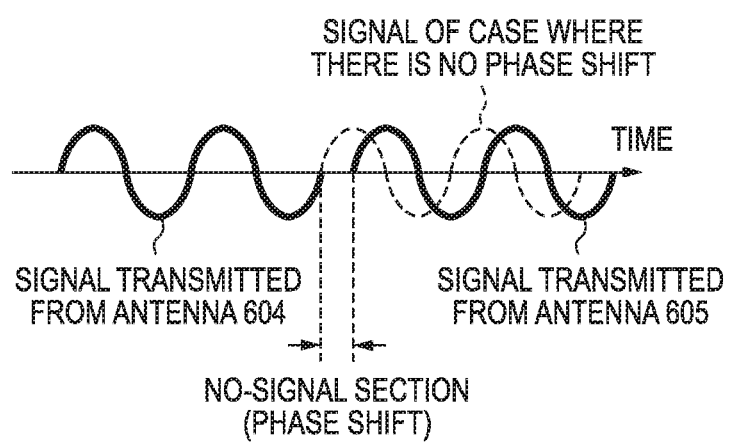
FIG. 19B is a view schematically illustrating a phase shift of signals transmitted from a plurality of antennas according to an embodiment.

Here, reference is made to FIG. 19A and FIG. 19B. FIG. 19A and FIG. 19B are views schematically illustrating a phase shift of signals transmitted from the antenna 604 and the antenna 605. As shown in FIG. 19A, a transmission period of the AoD Radio Signal 803 by the antenna 604 is set, and a transmission period of the AoD Radio Signal 803 by the antenna 605 is set immediately after that. In such a case, in the short-range wireless communication device 157, a no-signal section is generated between the transmission of the AoD Radio Signal 803 by the antenna 604 and the transmission of the AoD Radio Signal 803 by the antenna 605.

Meanwhile, the short-range wireless communication unit 110 can receive these wireless signals in a form shown in FIG. 19B. In other words, since the signal transmitted by the antenna 605 travels along a longer path than the signal transmitted by the antenna 604, and it arrives at the short-range wireless communication unit 110 later, and a no-signal section arises between these signals. Also, when the antenna 605 has transmitted signals first, the signals transmitted from the antenna 604 arrive at the short-range wireless communication unit 110 prior to all of the signals transmitted from the antenna 605 arriving at the short-range wireless communication unit 110. Also, in a case where a no-signal section of a predetermined length is set after the completion of a signal transmission period of the antenna 604 and a period of signal transmission from the antenna 605 is set, in the wireless signal received in the short-range wireless communication unit 110, a no-signal section longer than the predetermined length is measured. Similarly, when a no-signal section of a predetermined length is set after the completion of a signal transmission period of the antenna 605, and a period of signal transmission from the antenna 604 is set, in the wireless signal received in the short-range wireless communication unit 110, a no-signal section shorter than the predetermined length is measured. In this way, signals transmitted from a plurality of antennas are measured as a deviation of timings in accordance with the difference of each path length in the short-range wireless communication unit 110. Note that, in order to measure the deviation in timings, information on scheduling as to which signal is transmitted from which antenna and at which timing (for example, from the short-range wireless communication device 157 or the other device) is notified to the short-range wireless communication unit 110 in advance.

Incidentally, a deviation in reception timings corresponds to a deviation in phases of the reception signal. For example, in the example of FIG. 8, the signal transmitted from the antenna 605 travels along a path d2×cos(θ2) longer than that of the signal transmitted from the antenna 604, and arrives at the short-range wireless communication unit 110. Here, d2 is the distance between antennas between the antenna 604 and the antenna 605 d 801. Also, θ2 is the Angle of Departure θ 802. (AoD 802). Incidentally, AoD 802 is an angle formed between a straight line connecting the short-range wireless communication device 157 and the short-range wireless communication unit 110 and a straight line connecting the antenna 604 and the antenna 605.

When a light transmission speed is assumed to be c, a deviation of reception timing of d2×cos(θ2)/c seconds is generated due to this difference in path length, and at the same time, a phase difference of $$\psi2=2\pi\times d2\times\cos(\varphi)/\lambda \quad \text{Equation (3)}$$

is also generated. Note that, λ is the radio wave wavelength as described above. The short-range wireless communication unit 110 can identify the phase difference ψ2 by, for example, performing correlation detection on the basis of the first received signal among the plurality signals transmitted from the short-range wireless communication device 157 or the like. Then, the short-range wireless communication unit 110, using Equation (3), can calculate the AoD 802 as following using the phase difference ψ2

$$\theta2=\arccos((\psi2\times\lambda)/(2\pi\times d2)) \quad \text{Equation (4)}.$$

Incidentally, the short-range wireless communication unit 110 acquires the information of the distance between antennas d2 from the short-range wireless communication device 157 or the other device in advance. The short-range wireless communication unit 110, by calculating the AoD 802 as with Equation (4), can specify a direction of the short-range wireless communication unit 110 seen from the short-range wireless communication device 157 (in other words, an angle between the short-range wireless communication device 157 and the short-range wireless communication unit 110). Also, by the short-range wireless communication unit 110 knowing the arrangement of the antenna 604 and the antenna 605, the short-range wireless communication unit 110 can estimate the direction from which the radio waves came based on the AoD 802. For example, when the antenna 604 is arranged on the west side of the antenna 605, and the AoD 802 is estimated to be 45°, the short-range wireless communication unit 110 can estimate that the radio waves came from the southeast direction.

Furthermore, the short-range wireless communication unit 110 can estimate the distance from the short-range wireless communication device 157 by the reception intensity of radio waves and a transmission power value of the radio waves (TxPower 905 of FIG. 9). More specifically, the propagation loss can be calculated on the basis of the Tx Power value and the signal strength of the received advertising information, and the distance from the BLE advertiser device can be estimated. Thus, on the basis of the angle information estimated by AoA or AoD and distance information, the positional relationship between the short-range wireless communication device 157 can be known. Also, the short-range wireless communication unit 110 can estimate its position with a high level of accuracy by acquiring information on where the short-range wireless communication device 157 is positioned.

Incidentally, the short-range wireless communication unit 110 of the information processing terminal 101 is described above as detecting one direction of the short-range wireless communication device 157, but there is no limitation to this. The short-range wireless communication unit 110 may detect two or more directions of the short-range wireless communication device 157. Also, the short-range wireless communication unit 110, by detecting two or more directions of the short-range wireless communication device 157 and referring to each detection data, compared to detecting one direction of the short-range wireless communication device 157, can detect a distance between devices, directions and positions of the devices with a high level of accuracy.

Also, in the above described methods (1) and (2), the short-range wireless communication device 157 is assumed to be a transmitting side, and the short-range wireless communication unit 110 of the information processing terminal 101 is assumed to be a receiving side. However, the advertising signal (advertising information) may be transmitted by the short-range wireless communication unit 110 as the transmitting side, the signal may be received in the short-range wireless communication device 157, and a processing device 151a may calculate the position of the information processing terminal 101 by the above-mentioned calculation method (refer to the second embodiment).

Incidentally, the short-range wireless communication device 157 may perform advertising separately for the first advertising information and the second advertising information (scan response). In other words, the short-range wireless communication unit 110 may transmit the scan request in response to the first advertising information, and may transmit a connection request (CONNECT_REQ) in response to the second advertising information (scan response).

<Overview of GATT Communication>

Here, an overview of GATT (Generic Attribute Profile) communication in the BLE standard will be explained. The GATT is a profile for controlling reading/writing (transmitting/receiving) of information in the BLE standard.

The short-range wireless communication device 157 transmits the advertising information. The information processing terminal 101 can recognize existence of the communication device 151 by the short-range wireless communication unit 110 receiving the advertising information transmitted from the short-range wireless communication device 157.

When the information processing terminal 101 recognizes the communication device 151 and determines to connect with the communication device 151, the information processing terminal 101 transmits connection request information to the communication device 151. More specifically, the short-range wireless communication unit 110 transmits CONNECT_REQ which is a connection request for transitioning to a connection event which establishes a network connection by BLE. Incidentally, as described above, the short-range wireless communication device 157 may perform advertising separately for the first advertising information and the second advertising information (scan response). In other words, the short-range wireless communication unit 110 may transmit a scan request in response to the first advertising information and may transmit the connection request (CONNECT_REQ) in response to the second advertising information (scan response).

When the short-range wireless communication device 157 receives CONNECT_REQ, the information processing terminal 101 and the communication device 151 prepare to transition to the connection event. More specifically, the short-range wireless communication unit 110 and the short-range wireless communication device 157 notify the CPU 103 and the CPU 154 that the connection processing for the GATT communication has completed.

After that, the information processing terminal 101 and the communication device 151 transition from scanner and advertiser to master and slave respectively, and the information processing terminal 101 which is the master and the communication device 151 which is the slave establish a connection for the GATT communication (BLE connection). Note that, in the BLE standard, the master can form a "1:many" star-type topology with slaves. The information processing terminal 101 and the communication device 151 can perform data communication by the GATT communication method after establishing the BLE connection.

In the GATT communication, two roles—a GATT client and a GATT server—are defined on the basis of a data transfer source and a data transfer destination. The GATT client transmits a request to the GATT server, and receives a response from the GATT server. In the present embodiment, the information processing terminal 101 is the GATT client. The GATT client can execute the reading of information stored in a storage region in the short-range wireless communication unit of the GATT server, and can execute the writing of information to the storage region.

When the GATT server receives the request from the GATT client, the GATT server responds to the GATT client. In the present embodiment, the processing device 151a of the communication device 151 is the GATT server, and receives requests from the information processing terminal 101 which is the GATT client. Note that, the GATT server operates as a device that stores information such as status information of the GATT server.

Next, the GATT data format will be explained. FIG. 11 is a view illustrating an example of a GATT data structure. GATT data has a layered structure as shown in FIG. 11 and is configured from three elements referred to as a service, a characteristic, and a descriptor. However, the descriptor need not be present, and in the present embodiment, the descriptor is assumed to not be present in the GATT data that the short-range wireless communication device 157 configures.

The service, the characteristic, and the descriptor can be identified by a UUID (Universally Unique Identifier) represented by 32 digits. Here, the UUID is used as an identifier for identifying an object uniquely in software. The UUID is a 128-bit number, but it is ordinarily represented in hexadecimal, such as 550e8400-e29b-41d4-a716-446655440000. Note that, the service, the characteristic, and the descriptor may be defined by the Bluetooth SIG standard and may be vendor specific. The UUID which is vendor specific is represented in 32 digits as described above, and the UUID which is defined by the Bluetooth SIG standard is represented in 4 digits. In other words, for example, a UUID which is defined by the Bluetooth SIG standard is represented as 2A49.

A service is formed by grouping attributes in GATT data in common divisions, and each service includes one or more characteristics. A single value is set for each characteristic. The descriptor is set to an attribute value which is used when the characteristic requires additional information. Read and write attributes, which are setting values indicating whether or not reading and writing of a GATT client is permitted, can be set for each of the service, the characteristic, and the descriptor.

The GATT client, by designating the UUID of a service and a characteristic respectively, can execute read and write in relation to a value set for a designated characteristic. However, whether read and write can be executed is based on read and write attributes set for each service and characteristic.

FIG. 12 is a view showing an example of GATT data constructed by the short-range wireless communication device 157. In GATT data of FIG. 12, "Service UUID" indicates the UUID assigned to each service. "Service name" indicates a name of each service. "Characteristic UUID" indicates a UUID assigned to each characteristic. "Characteristic name" indicates a name of each characteristic. "Service read possible" indicates whether the information processing terminal 101 can read a value related to each service. "Service write possible" indicates whether the information processing terminal 101 can write a value related to each service. "Characteristic read possible" indicates whether the information processing terminal 101 can read a value related to each characteristic. "Characteristic write possible" indicates whether the information processing terminal 101 can write a value related to each characteristic. "Characteristic indication possible" indicates whether it is possible to indicate (notify) to the information processing terminal 101 in a case where the communication device 151 updates a value related to a respective characteristic. "Pairing necessary" indicates whether, if unpaired, a value related to a respective characteristic is not permitted to be written or read in the information processing terminal 101.

The information processing terminal 101, when "Service read possible" indicates that read is possible (○) and "Characteristic read possible" indicates that read is possible (○), a value related to a corresponding characteristic can be read. Also, the information processing terminal 101, when "Service read possible" indicates that read is possible (○) and "Characteristic read possible" indicates that read is impossible (blank), cannot read a value related to a corresponding characteristic. "Value" indicates a value set to the respective characteristic. Also, when "Pairing necessary" indicates that pairing is unnecessary (blank), the information processing terminal 101 can read or write a value related to the corresponding characteristic even in a state in which it is not paired with the communication device 151. Meanwhile, when "Pairing necessary" indicates that pairing is necessary (○), the information processing terminal 101 cannot read or write a value related to the corresponding characteristic in a state in which it is not paired with the communication device 151.

In the present embodiment, a pairing process between the information processing terminal 101 and the communication device 151 is not executed. However, limitation is not made to this, and processing for pairing between the information processing terminal 101 and the communication device 151 may be executed.

<Example of Processing of the Processing Device>

Figure 16:
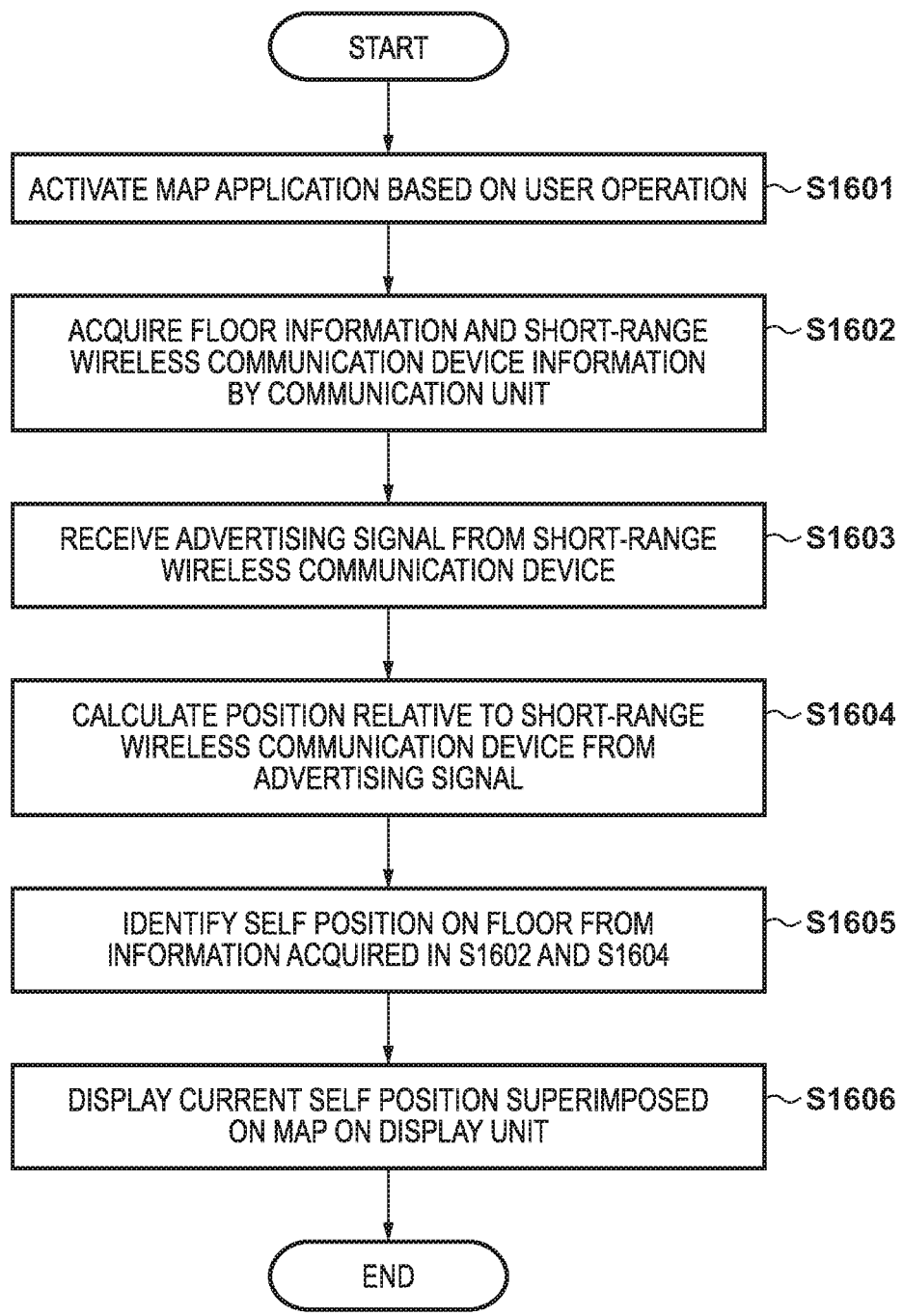
FIG. 16 is a flowchart illustrating a flow of processing of a map application in the information processing terminal according to an embodiment.

Next, details of processing of the map application will be explained using FIG. 16. FIG. 16 is a flowchart illustrating a flow of processing of a map application in the information processing terminal 101. This flowchart is realized by, for example, the CPU 103 reading a program stored in the ROM 104 or the external storage device 106 into the RAM 105 and executing it.

Firstly, in step S1601, the CPU 103 activates a map application based on an operation by a user. The CPU 103, for example, activates the map application when the input interface 102 receives an input related to the activation of the map application from the user, and displays the map application on the display unit 108.

Subsequently, in step S1602, the CPU 103 acquires floor information and predefined device information from the communication device 151 via the communication unit 109. Here, the floor information is, for example, spatial data indicating information of the layout of rooms on the floor or the shape of the floor. Incidentally, in the present embodiment, the floor is not limited to a specific floor or to one that is within a specific building, and it may be a region (space) having a fixed size such as an underground mall, indoor or outdoor commercial facilities, or an entire town.

Also, predetermined device information is identification information of the short-range wireless communication device 157 or the communication device 151, for example, and installation position information indicating the positioning of the short-range wireless communication device 157 on the floor as shown in FIG. 15. In the installation position information, the position on the floor is defined three-dimensionally from a starting point 405, an X-axis 406, a Y-axis 408, and a Z-axis 407 of FIG. 4A and FIG. 4B which is described later. This information is stored, for example, in the storage device 155 of the communication device 151.

The information processing terminal 101 stores information on the position at which the short-range wireless communication device 157 is installed related to the acquired floor map. In the present embodiment, as installation position, the installation position in a floor 400 (refer to FIG. 4A and FIG. 4B) is used, but limitation is not made to this. The short-range wireless communication device 157 may be installed as appropriate in a fixed region such as an underground mall, a commercial facility, or an entire town. Also, in the present embodiment, the timing at which the above-mentioned predetermined information is acquired is the time of activation of the map application, but the acquisition timing is not limited to this, and information may be acquired continuously, may be acquired in at fixed intervals, or may be acquired just once. Also, the floor map may be a spatial map based on spatial data.

Next, in step S1603, the CPU 103 searches for advertising information from the short-range wireless communication device 157 by the short-range wireless communication unit 110. In other words, the short-range wireless communication unit 110 receives the advertising information (advertising signal). Note that, the advertising information comprises the information such as the identification information of the short-range wireless communication device 157 or the communication device 151. Also, in the present embodiment, searching for the advertising information is started automatically when the map application is activated, but the search may be started based on the reception of an instruction to execute position search processing from user.

Next, in step S1604, the CPU 103, based on the advertising information, acquires information indicating the relative position between the short-range wireless communication device 157 which is the transmission source and the information processing terminal 101 which is the self device. In other words, by a short-distance wireless communication signal between the information processing terminal 101 and the short-range wireless communication device 157 which is positioned within a predetermined distance on the floor, information indicating the relative position between the information processing terminal 101 and the short-range wireless communication device 157 is acquired. As an example, the CPU 103 calculates the relative position (distance and angle) between the short-range wireless communication device 157 which is the transmission source and the information processing terminal 101 which is the self device. In the case of the present embodiment, an angle of between devices is calculated by the AoD method explained with reference to FIG. 8. Furthermore, the distance between devices is calculated based on the signal strength of the advertising information.

Next, in step S1605, by the CPU 103 comparing the advertising information received from the short-range wireless communication unit 110 and the predetermined device information acquired in step S1602, a position in the floor of the device transmitting the advertising information is acquired. After that, based on the relative distance and angle, which are calculated in step S1604, between the device which is the transmission source of the advertising information and the information processing terminal 101 which is the self device and the position on the floor of the device which is the transmission source, the position on the floor of the information processing terminal 101 which is the self device is acquired. For example, the CPU 103 acquires information on the coordinates of the self device within the floor based on the starting point 405, the X-axis 406, the Y-axis 408, and the Z-axis 407 of FIG. 4A and FIG. 4B which is described later.

Finally, in step S1606, the CPU 103, in the floor information (spatial data) acquired in step S1602, identifies the position on the floor of the information processing terminal 101 which is itself calculated in step S1605. By this, a map image on which is superimposed a display item indicating the position of the information processing terminal on the floor map (on the spatial map) based on the spatial data is displayed in the display unit 108. In other words, the CPU 103 performs display control to cause the display unit 108 to display the floor map associated with the position of the short-range wireless communication device 157. At that time, the CPU 103, by using the information indicating the relative position acquired in step S1604, causes the display unit 108 to display the position of the information processing terminal 101 superimposed on the floor map.

Application Example

FIG. 4A is a perspective view illustrating an example of a floor where the short-range wireless communication device 157 is positioned, and FIG. 4B is a plan view of FIG. 4A. In FIG. 4A and FIG. 4B, an example where the short-range wireless communication device 157 is the transmission source of the advertising information is explained.

The example of FIG. 4A illustrates a state in which a user 401 to whom the information processing terminal 101 belongs is on the floor 400. Three short-range wireless communication devices 157*a*, 157*b*, and 157*c* are installed in the ceiling. Note that, in the present embodiment, in order to reduce the error to within a few cm, accurate position information (information of distance and direction) of the information processing terminal 101 is assumed to be acquired by using the three short-range wireless communication devices 157*a*-157*c*. However, limitation is not made on the number of the short-range wireless communication devices 157. For example, one or more short-range wireless communication devices 157 may be provided. Also the installation location is not limited to a ceiling; the short-range wireless communication device 157 may be installed on a wall, may be installed on a floor, may be installed so as to be lined up regularly, or may be installed irregularly. Furthermore, an example within one floor is explained in the present embodiment, but the location of usage is not limited to this, and, for example, the location may be an entire building, or an outdoor location. In the present embodiment, to perform a position measurement by using the AoD method, the information processing terminal 101 is a receiving side like FIG. 4B, and the short-range wireless communication devices 157*a*-157*c* transmit advertising signals 402-404 as a transmission side.

When the user 401 activates the map application in the information processing terminal 101 (in step S1601 of FIG. 16), the CPU 103 of the information processing terminal 101 acquires information of the floor 400 from the communication device 151 by the communication unit 109 (in step S1602). Here, the information of the floor 400 is spatial data such as a structure or a shape of the floor 400. Next, the information processing terminal 101 receives the above described advertising signal (in step S1603). The information processing terminal 101 compares information received from the processing device 151*a* and the advertising information. When the transmission source of the advertising information is determined to be from a predetermined device, the CPU 103 calculates the distance and angle between these based on the signal strength, the phase difference, or the wavelength from the short-range wireless communication devices 157*a*-157*c* (FIG. 8 in step S1604).

The CPU 103, by combining acquired information of the floor 400, installation positions of the short-range wireless communication devices 157*a*-157*c*, and information on relative distances and angles between the self device and the short-range wireless communication devices 157*a*-157*c*, identifies a position on the floor 400 of the self device (in step S1605). After that, the CPU 103 displays the map image indicating a position on the floor 400 of the information processing terminal 101 on the display unit 108 of the information processing terminal 101 (in step S1606).

Incidentally, in a case where a plurality of the short-range wireless communication devices 157 are provided, the CPU 103 does not necessarily need to acquire the relative position with respect to all of the short-range wireless communication devices 157, and the short-range wireless communication devices 157 to be used for acquiring the relative position may be selected as appropriate. For example, the CPU 103 may acquire the relative position between the short-range wireless communication devices 157 from which a signal of a signal strength greater than or equal to a particular value is received among the plurality of short-range wireless communication devices 157 which can communicate with the information processing terminal 101. In other words, the CPU 103 may acquire the relative position with respect to the short-range wireless communication devices 157 which are at a relatively short-range. For example, when a large number of short-range wireless communication devices 157 are positioned in relatively wide area, or a target floor is complicated as with an underground mall, signals from farther short-range wireless communication devices 157 may be difficult to receive. In such a case, the CPU 103 can acquire the relative position based on the short-range wireless communication devices 157 from which signals can be received. By this, the position on the floor 400 of the self device is identified more effectively.

<Example of Display of Map Application>

Figure 10A:
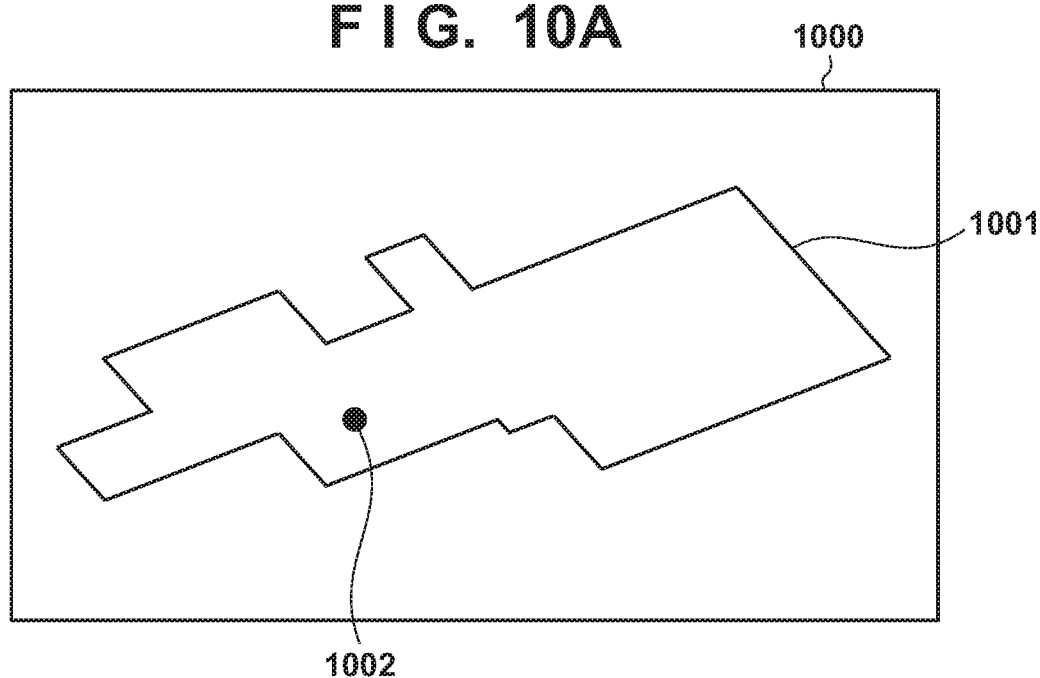
FIG. 10A is a view illustrating an example of display of a map application according to an embodiment.
Figure 10B:
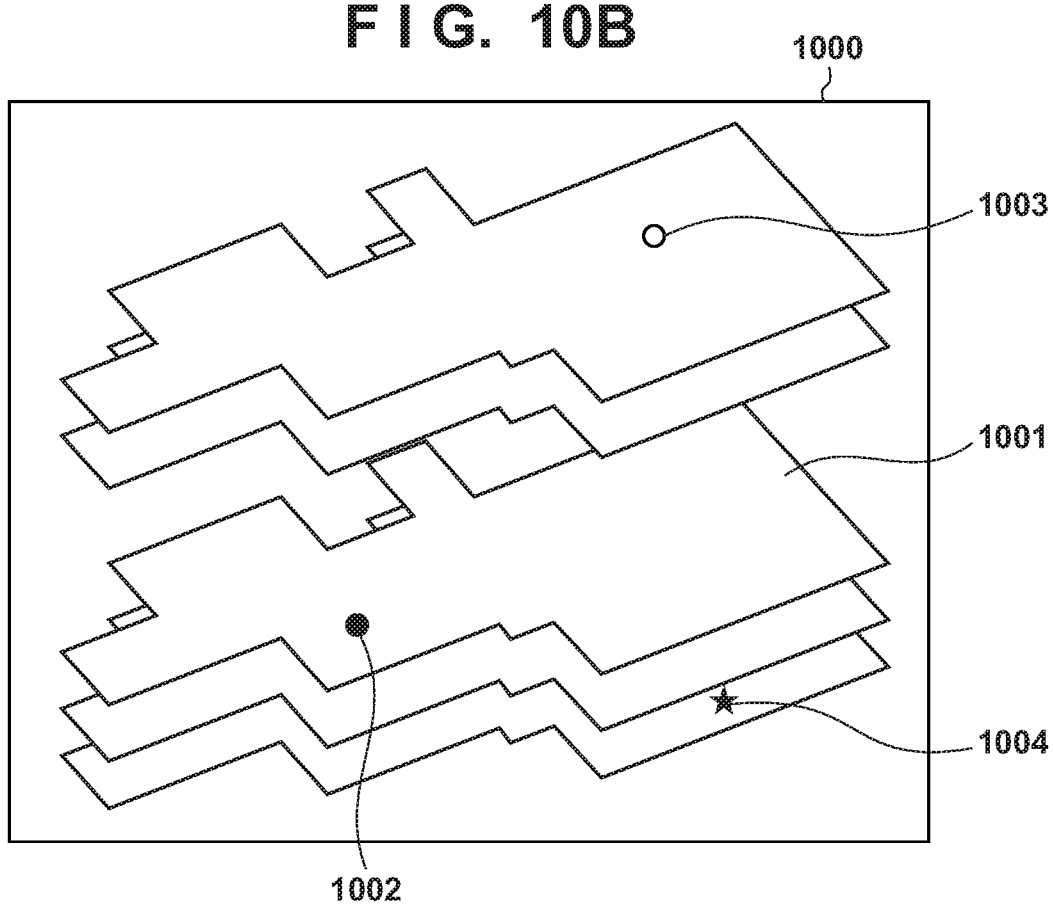
FIG. 10B is a view illustrating an example of display of a map application according to an embodiment.

FIG. 10A is an example of display of a map application. In the present embodiment, a floor map 1001 of the floor 400 is displayed in an application display region 1000, and a position of the information processing terminal 101 is displayed on the floor map 1001 (on the floor map) as a current position 1002. Here, because the floor map 1001 is associated with the positions of the short-range wireless communication devices 157, the position of the information processing terminal 101 can be displayed on the floor map 1001. However, limitation is not made to the display of the present embodiment, for example, a position of stairs, an elevator, or a restroom may be displayed, and a three-dimensional display in which hierarchical information is added, as in FIG. 10B, may be used. In other words, the floor map 1001 may comprise a plurality of floors.

Also, the map application may comprise functions other than the map function. A function for prompting sales by displaying information on stores in the vicinity of the information processing terminal 101, coupons, or detailed information about items in front of the user may be comprised, or a function for broadcasting news such as information on a lost child may be comprised. A function for displaying, when registration with the map application is performed in advance, a position 1003 of another registered information processing terminal may be comprised. In such a case, the other information processing terminal may acquire the position 1003 on the floor map 1001 of the self device by a similar method to the information processing terminal 101. The information processing terminal 101 may receive the position 1003 from other target information processing terminal directly, or may acquire it via the processing device 151a. Also, a function for displaying, when registration with the map application is performed in advance, a position 1004 of a parked car or a function for performing road guidance to a specific place may be comprised. Here, in the case of displaying the position 1004 of a parked car, for example, the user may acquire the position 1004 by using the information processing terminal 101 when parking, and then register that information to the map application. Also, for example, a car may comprise a processing device which can communicate with the short-range wireless communication device 157, and acquired position information may be transmitted to the information processing terminal 101 directly or via the processing device 151a. The specific place may be a store, stairs, an elevator, an escalator, a lost child center, a ticket gate, a place where an item that the user wants is, or the like. The predetermined application is not limited to the map application, and an application program with a function other than the map function may be used.

As described above, by virtue of the present embodiment, by using a plurality of short-range wireless communication devices 157 which employ Bluetooth 5.1 communication, it is possible to detect a position with little error even in situations where GPS cannot perform well, such as when indoors. Because a display that indicates the current position on a map based on that position detection is possible, higher accuracy position display can be performed. Accordingly, it is possible to improve user convenience.

Second Embodiment

In contrast to the first embodiment which uses the AoD method, the second embodiment performs position measurement using an AoA method. In the first embodiment, a position is calculated in the information processing terminal 101 by using the AoD method, but, depending the performance of the information processing terminal 101, there are cases where it is more effective to calculate the position by aggregating position information measured in the communication device 151. Below in the second embodiment, explanation will be given of a system in which the short-range wireless communication unit 110 is caused to function as an advertiser (or slave), and the short-range wireless communication device 157 is caused to function as a scanner (or master), and by performing position measurement by using the AoA method, measured information is aggregated in the communication device 151 to calculate the position.

A configuration of a position measurement system including the information processing terminal 101 and the communication device 151 according to the second embodiment and a hardware configuration of the information processing terminal 101 and the communication device 151 are similar to in the first embodiment. Also, a software module configuration of the information processing terminal 101 and the communication device 151 and a configuration of various applications are similar to in the first embodiment. Explanation about configurations similar to those of the first embodiment is omitted in some cases.

A sequence of processes performed by the information processing terminal 101 and the communication device 151 also includes similar portions to the first embodiment. Points of difference in the second embodiment are that position measurement is performed using the AoA method, that the information processing terminal 101 is on the signal transmitting side, and the short-range wireless communication devices 157a-157c are on the receiving side, and that information measured from received signals is aggregated in the communication device 151.

<Example of Processing by Processing Device and Communication Device>

Next, by using FIG. 17, details of processing of the map application in the second embodiment will be explained. FIG. 17 is a flowchart illustrating the flow of processing of a map application in the information processing terminal 101 and the communication device 151. The processing on the information processing terminal 101 side of this flowchart is realized, for example, by the CPU 103 reading out a program stored in the ROM 104 or the external storage device 106 into the RAM 105 and executing it. Also, the processing on the communication device 151 side of this flowchart is realized by, for example, the CPU 154 reading out the program stored in the storage device 155 into the RAM 153, and executing it. Incidentally, steps S1701 to S1703 correspond to processing of the information processing terminal 101, and steps S1711 to S1715 correspond to processing of the communication device 151.

Firstly, in step S1701, the CPU 103 of the information processing terminal 101 activates the map application based on a user operation. After that, in step S1702, the CPU 103 starts transmitting advertising information by the short-range wireless communication unit 110.

In step S1711, the short-range wireless communication device 157 receives the advertising information transmitted in step S1702. In step S1712, the CPU 154 of the communication device 151 acquires information on the signal strength of the advertising information that the short-range wireless communication device 157 received in step S1711 and the angle of reception. In other words, the short-range wireless communication device 157, based on the received advertising information, transmits information regarding the signal strength and angle to the processing device 151a.

Next, in step S1713, the CPU 154 calculates information on the relative position of the information processing terminal 101 and the short-range wireless communication device 157 based on the information acquired in step S1712. In step S1714, the CPU 103 integrates information of the relative position calculated in step S1713 and the information stored in the storage device 155 of the communication device 151 or the like, and calculates the current position on the floor of the information processing terminal 101. The information stored in the storage device 155 is information of a floor (spatial data) or position information on the floor of the short-range wireless communication device 157, for example. Also, the CPU 103, based on the identified relative position information of the information processing terminal 101, superimposes the position of the information processing terminal 101 onto the floor map to generate a map image indicating the current position of the information processing terminal 101.

Next, in step S1715, the CPU 154 transmits the map image indicating the current position of the information processing terminal 101 generated in the processing of step S1714 to the information processing terminal 101 via the communication unit 156. After that, the processing of the communication device 151 side completes.

Finally, in step S1703, the CPU 103 of the information processing terminal 101 receives the map image indicating the current position of the information processing terminal 101 transmitted in step S1715 from the short-range wireless communication unit 110, and outputs it to the display unit 108. After that, the processing of the processing device side completes.

Note that, in the present embodiment, the relative position between the information processing terminal 101 and the short-range wireless communication device 157 is calculated in the communication device 151, but limitation is not made to this. For example, a processor such as a CPU which the short-range wireless communication device 157 comprises may calculate the relative position between the information processing terminal 101 and self device, and may transmit the calculated information to the communication device 151. Also, in the present embodiment, the position information of the information processing terminal 101 and is superimposed on the floor map in the communication device 151, but limitation is not made to this. The position information of the information processing terminal 101 and the information of the floor map may be transmitted separately from the communication device 151 to the information processing terminal 101, and may be superimposed in the information processing terminal 101.

Application Example

Figure 13:
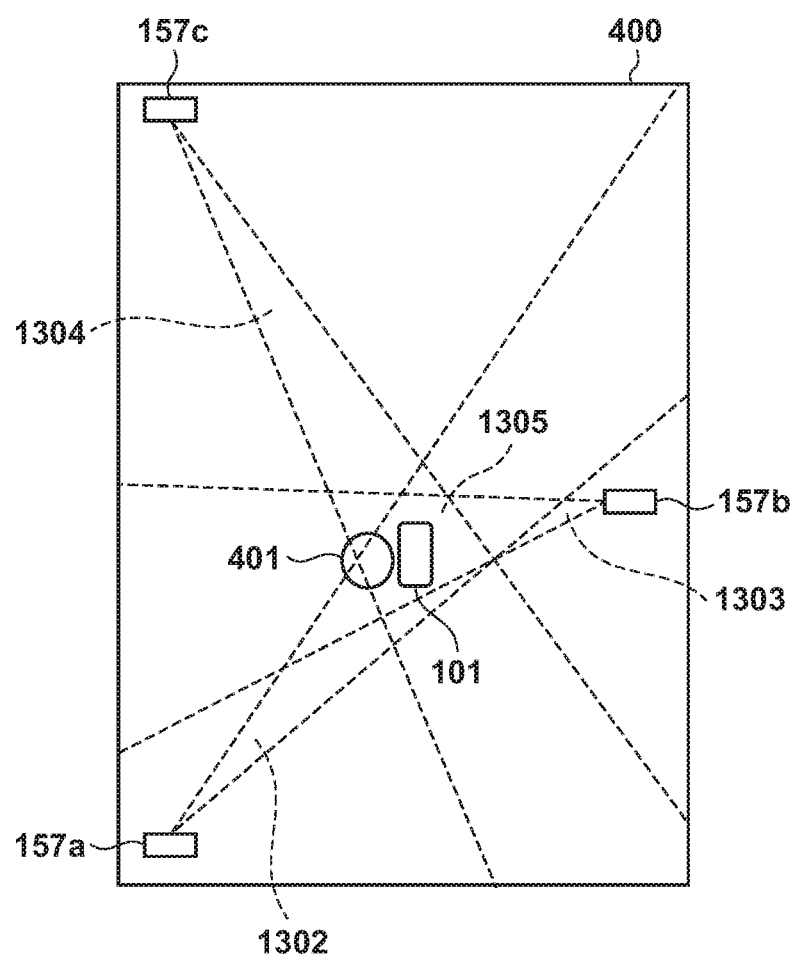
FIG. 13 is a plan view illustrating an example of a floor where short-range wireless communication devices according to an embodiment are positioned.

FIG. 13 is a plan view illustrating an example of a floor where the short-range wireless communication device 157 according to the second embodiment is arranged. In FIG. 13, the short-range wireless communication unit 110 is explained as the transmission source of the advertising information. Firstly, a difference from FIG. 4B is that the method of exchanging signals is the AoD method in FIG. 4B where it is the AoA method in FIG. 13.

In FIG. 13, the short-range wireless communication devices 157a to 157c detect advertising signals transmitted from the short-range wireless communication unit 110 of the information processing terminal 101. Then, the CPU 103 of the communication device 151 calculates how far and in what direction the information processing terminal 101 is from each of the short-range wireless communication devices 157a to 157c. Here, the ranges in which the information processing terminal 101 may exist which are calculated from the short-range wireless communication devices 157a, 157b, and 157c are called presence ranges 1302, 1303, and 1304, respectively. The information of presence ranges 1302 to 1304 is aggregated in the communication device 151 from the short-range wireless communication devices 157a to 157c, and an estimated range 1305 where the three presence ranges overlap is extracted. Because the information processing terminal 101 is present in the estimated range 1305, it is possible to extract a position with an error of only a few cms. Note that, in the present embodiment, the number of short-range wireless communication devices 157 is assumed to be three, but limitation is not made to that number. For example, there may be one or more short-range wireless communication devices 157.

In the second embodiment, the position of the information processing terminal 101 is calculated in the communication device 151, and a map image in which the position of the communication device 151 is superimposed on a floor map it possesses and transmitted it to the information processing terminal 101. The CPU 103 of the information processing terminal 101 displays the received map image on the display unit 108. In the present embodiment, the map image is generated in the communication device 151, but the processing is not limited to this. The position information of the information processing terminal 101 and the floor map that the communication device 151 possesses may be transmitted separately from the communication device 151 to the information processing terminal 101, and the superimposition onto the floor map, and display on the display unit 108 may be performed on the information processing terminal 101 side after reception.

As described above, in the second embodiment, by the communication device 151 handling the processing for acquiring the position of the information processing terminal 101 and superimposing it on the map information, the acquisition of the position information is possible irrespective of the performance of the information processing terminal 101. By this, it is possible to perform position display with higher accuracy, and to improve convenience for the user.

Third Embodiment

In the third embodiment, the AoD method which is used in the first embodiment is performed using another configuration. In the first embodiment, a system comprising the information processing terminal 101 and the communication device 151 was described. However, in a case where the present system is to be developed in an extremely limited area, it takes money and effort to prepare the equivalent of the communication device 151. Accordingly, an embodiment in which the position of the information processing terminal 101 can be measured without the communication device 151 will be explained below. Incidentally, the hardware configuration of the information processing terminal 101, the software module configuration of the information processing terminal 101, and configuration of various application are the same as in the previously described first embodiment. Also, explanation of other similar configurations to the first embodiment may be omitted in some cases.

FIG. 14 is a block diagram illustrating a configuration example of the information processing terminal 101 and a short-range wireless communication device 1401 according to the third embodiment. The point of difference from the first embodiment is that the communication device 151 and the external access point 131 are not present, and the short-range wireless communication device 157 of FIG. 1 is the short-range wireless communication device 1401 which is independent. The information processing terminal 101 receives a signal from the short-range wireless communication device 1401 directly by using the short-range wireless communication unit 110.

The sequence of processing performed by the map application is almost the same as the first embodiment which was previously described, but the point of difference is that the information of the floor 400 and the information of the short-range wireless communication device 1401 is stored in the information processing terminal 101. Next, details of processing will be explained using FIG. 18.

<Example of Processing of the Processing Device>

FIG. 18 is a flowchart illustrating the flow of processing of a map application in the information processing terminal 101 according to the third embodiment. This flowchart is realized by, for example, the CPU 103 reading out a program which is stored in the ROM 104 or the external storage device 106 into the RAM 105 and executing it.

Step S1801 is similar to step S1601. Also, steps S1802 and S1803 are similar to steps S1603 and S1604, respectively.

In step S1804, the information processing terminal 101 compares received advertising information, information of the floor stored in the information processing terminal 101, and predefined device information, and acquires the position on the floor of the device that transmitted the advertising information. Here, the information of the floor is spatial data indicating information on the layout of the floor or the like. Also, the predetermined device information, information for identifying the short-range wireless communication device 157 and information on the position on the floor at which the short-range wireless communication device 157 is installed as shown in FIG. 15. The information processing terminal 101 defines the position on the floor three-dimensionally from the starting point 405, the X-axis 406, the Y-axis 408, and the Z-axis 407 of previously described FIG. 4A and FIG. 4B, and stores it as information on the position at which the short-range wireless communication device 157 is installed on the floor. In the present embodiment, the installation position on the floor is used, but limitation is not made to this. For example, the position may be with respect to as wide or narrow a space as necessary, and may be with respect to an entire building, an underground mall, an entire town, or the like. Next, based on the relative distance and angle, which are calculated in step S1803, between the device which is the transmission source of the advertising information and the information processing terminal 101 which is the self device and the position on the floor of the device which is the transmission source, the location on the floor of the information processing terminal 101 which is the self device is acquired.

Also, step S1805 is similar to step S1606. Note that, in the present embodiment, the information processing terminal 101 stores the information of the floor 400 and the information of the short-range wireless communication device 1401, but limitation is not made to this. For example, the short-range wireless communication device 1401 may store the information, and may transmit it to the information processing terminal 101 by incorporating it into the advertising signal.

As described above, by the third embodiment, even in a configuration which is not provided with the communication device 151, position display with higher accuracy can be performed by storing information in the short-range wireless communication device 1401 or the information processing terminal 101.

Note that, the point of difference from the above described first embodiment is described in the explanation of the present embodiment, but it goes without saying that it can be applied to the above described second embodiment. By the above described first to third embodiments, it is possible to identify the current position with high accuracy within an error of only a few cm even in an environment where GPS cannot achieve sufficiently good performance.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103172, filed May 31, 2019, which is hereby incorporated by reference herein in its entirety.

What is claimed is:

1. A display system comprising a communication device, a processing device, and an information processing terminal capable of communicating with the communication device and the processing device, the system comprising:
   at least one processor causing the processing device to:
   acquire, based on information related to an angle between the information processing terminal and the communication device, which is obtained using advertising information communicated based on a first communication method between the information processing terminal and the communication device in a space, information indicating a relative position between the information processing terminal and the communication device;

generate data of a spatial map in which a position of the information processing terminal in the space is indicated based on the acquired information indicating the relative position; and transmit the data of the spatial map by a communication based on a second communication method different from the first communication method, wherein the transmitted data of the spatial map is received by the information processing terminal and the information processing terminal displays the spatial map, and wherein the information processing terminal transmits the advertising information and the communication device receives the advertising information.

2. The display system according to claim 1, wherein the processing device includes a storage configured to store the information regarding a position of the communication device, and the processing device generates, by using the information regarding the position of the communication device and the information indicating the relative position, the data of the spatial map.

3. The display system according to claim 1, wherein the processing device controls a communication of the communication device.

4. The display system according to claim 1, wherein the system comprises a plurality of the communication device.

5. The display system according to claim 1, wherein the spatial map comprises a plurality of floors.

6. The display system according to claim 1, wherein the spatial map includes a position of another information processing terminal that can communicate with the communication device.

7. The display system according to claim 1, wherein the communication device and the information processing terminal execute communication based on a Bluetooth 5.1 standard as the first communication method and execute communication based on a communication method conforming to the IEEE 802.11 series as the second communication method.

8. A processing device comprising:
at least one processor causing the processing device to:
acquire, based on information related to an angle between an information processing terminal and a communication device, which is obtained using advertising information communicated based on a first communication method between the information processing terminal and the communication device in a space, information indicating a relative position between the information processing terminal and the communication device;

generate data of a spatial map in which a position of the information processing terminal in the space is indicated based on the acquired information indicating the relative position; and transmit the data of the spatial map by a communication based on a second communication method different from the first communication method, wherein the transmitted data of the spatial map is received by the information processing terminal and the terminal displays the spatial map, and wherein the information processing terminal transmits the advertising information and the communication device receives the advertising information.

9. A method of displaying by a display system comprising a communication device, and processing device, and an information processing terminal capable of communicating with the communication device and the processing device, the method comprising:
acquiring, based on information related to an angle between the information processing terminal and the communication device, which is obtained using advertising information communicated based on a first communication method between the information processing terminal and the communication device in a space, information indicating a relative position between the information processing terminal and the communication device;

generating data of a spatial map in which a position of the information processing terminal in the space is indicated based on the acquired information indicating the relative position; and transmitting the data of the spatial map by a communication based on a second communication method different from the first communication method, wherein the transmitted data of the spatial map is received by the information processing terminal and the information processing terminal displays the spatial map, and wherein the information processing terminal transmits the advertising information and the communication device receives the advertising information.

10. A non-transitory computer-readable storage medium storing a program for causing a computer of a processing device to:
acquire, based on information related to an angle between an information processing terminal and a communication device, which is obtained using advertising information communicated based on a first communication method between the information processing terminal and the communication device in a space, information indicating a relative position between the information processing terminal and the communication device;

generate data of a spatial map in which a position of the information processing terminal in the space is indicated based on the acquired information indicating the relative position; and transmit the data of the spatial map by a communication based on a second communication method different from the first communication method, wherein the transmitted data of the spatial map is received by the information processing terminal and the terminal displays the spatial map, and wherein the information processing terminal transmits the advertising information and the communication device receives the advertising information.

* * * * *